(12) United States Patent
Tomida et al.

(10) Patent No.: US 7,731,808 B2
(45) Date of Patent: Jun. 8, 2010

(54) HOT-ROLLED STEEL SHEET AND COLD-ROLLED STEEL SHEET AND MANUFACTURING METHOD THEREOF

(75) Inventors: Toshirou Tomida, Hyogo (JP); Norio Imai, Hyogo (JP); Mitsuru Yoshida, Sanda (JP); Kaori Kawano, Neyagawa (JP); Masayuki Wakita, Nishinomiya (JP); Tamotsu Toki, Hyogo (JP); Masanori Yasuyama, Hyogo (JP); Hitomi Nishibata, Hyogo (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 12/068,045

(22) Filed: Feb. 1, 2008

(65) Prior Publication Data

US 2008/0202639 A1 Aug. 28, 2008

Related U.S. Application Data

(63) Continuation of application No. PCT/JP2006/315390, filed on Aug. 3, 2006.

(30) Foreign Application Priority Data

Aug. 3, 2005 (JP) ............................. 2005-225803

(51) Int. Cl.
C22C 38/00 (2006.01)
C21D 8/02 (2006.01)
C21D 8/04 (2006.01)

(52) U.S. Cl. ........................ 148/320; 148/661; 420/8

(58) Field of Classification Search ......... 148/328–337, 148/661, 320; 420/8–129
See application file for complete search history.

(56) References Cited

U.S. PATENT DOCUMENTS

2004/0112482 A1* 6/2004 Inoue et al. ................. 148/602

FOREIGN PATENT DOCUMENTS

| EP | 1350859 A1 * | 8/2001 |
|---|---|---|
| JP | 59-205447 | 11/1984 |
| JP | 9-176782 | 7/1997 |
| JP | 10-17982 | 1/1998 |
| JP | 11-1747 | 1/1999 |
| JP | 11-152544 | 6/1999 |
| JP | 2002-180187 | 6/2002 |

* cited by examiner

Primary Examiner—George Wyszomierski
Assistant Examiner—Mark L Shevin
(74) Attorney, Agent, or Firm—Clark & Brody

(57) ABSTRACT

A steel sheet excellent in mechanical strength, workability and thermal stability and suited for use as a raw material in such fields of manufacturing automobiles, household electric appliances and machine structures and of constructing buildings, and a manufacturing method thereof are provided. The steel sheet is a hot-rolled steel sheet of carbon steel or low-alloy steel, the main phase of which is ferrite, and is characterized in that the average ferrite crystal grain diameter D (μm) at the depth of ¼ of the sheet thickness from the steel sheet surface satisfies the relations respectively defined by the formulas (1) and (2) given below and the increase rate X (μm/min) in average ferrite crystal grain diameter at 700° C. at the depth of ¼ of the sheet thickness from the steel sheet surface and said average crystal diameter D (μm) satisfy the relation defined by the formula (3) given below:

$1.2 \leq D \leq 7$  formula (1)

$D \leq 2.7 + 5000/(5+350 \cdot C + 40 \cdot Mn)^2$  formula (2)

$D \cdot X \leq 0.1$  formula (3)

wherein C and Mn represent the contents (in % by mass) of the respective elements in the steel.

9 Claims, 3 Drawing Sheets

HOT-ROLLED STEEL SHEET AND COLD-ROLLED STEEL SHEET AND MANUFACTURING METHOD THEREOF

This application is a continuation of International Patent Application No. PCT/JP2006/315390, filed Aug. 3, 2006. This PCT application was not in English as published under PCT Article 21(2).

TECHNICAL FIELD

The present invention relates to a hot-rolled or cold-rolled steel sheet having ultra fine crystal grains, and to a manufacturing method thereof. More particularly, it relates to a hot-rolled or cold-rolled steel sheet excellent in mechanical strength, workability and thermal stability and suited for use as a raw material in such fields of manufacturing automobiles, household electric appliances and machine structures and of constructing buildings, and to a manufacturing method thereof.

BACKGROUND ART

The steel sheet to be used as a raw material for structural members in transport machines, typically automobiles, and various industrial machines is sometimes required not only to be excellent in such mechanical characteristics as strength, workability and toughness but also to have weldability in parts assembly and/or corrosion resistance during use. In order to generally improve the mechanical characteristics of a steel sheet, it is effective to render a steel sheet with fine microstructure. Therefore, a number of methods in order to render a steel sheet with fine microstructure have been proposed.

To sum up, the means for rendering a steel sheet with fine microstructure as known in the prior art include (i) the high reduction rolling method, (ii) the controlled rolling method, (iii) the alloying element addition method, and combinations of these.

The high reduction rolling method (i) is a technique which comprises employing a rolling reduction of about 50% or higher to cause accumulation of great strains in one rolling pass and then transforming austenite grains to fine ferrite grains or recrystallizing relatively large ferrite grains into fine ferrite grains caused by the great strains. Such technique makes it possible to obtain an ultra fine ferritic microstructure with a grain size of 1 to 3 µm by heating to a temperature not higher than about 1000° C. and then carrying out high-reduction rolling within a low temperature zone around 700° C. However, this method is difficult to realize on an industrial scale and, in addition, has a problem that since the fine ferritic microstructure readily allows grain growth during heat treatment, and the welded portion, upon welding, becomes softened or, upon hot-dip Zn plating, the mechanical characteristics expected are lost.

The controlled rolling method (ii) is a technique comprising carrying out multi-pass rolling generally at a temperature not lower than about 800° C. employing a reduction, per rolling pass, of not higher than 20 to 40%, followed by cooling. Various modifications have been disclosed, for example such as the method employing a rolling temperature within a narrow range around the $Ar_3$ point, the method employing a shortened pass-to-pass time in rolling, and the method causing dynamic recrystallization of austenite while controlling the strain rate and temperature. However, no full investigations have been made concerning the cooling after rolling. While it is said that water-cooling immediately after rolling is preferred, the cooling, though said to be made immediately, is actually started after the lapse of 0.2 second or a longer period after rolling, and the cooling rate is at most about 250° C./second. Such method can reduce the ferrite crystal grain size of low-carbon steel simple in composition only to about 5 µm. Therefore, it is impossible to improve the mechanical characteristics to satisfactory levels.

The alloying element addition method (iii) is to render ferrite crystal grains fine by addition of a minute amount of at least one alloying element capable of suppressing recrystallization or recovery of austenite. Such alloying elements as Nb and Ti form carbides and/or segregate at grain boundaries to thereby pre-vent recovery and recrystallization of austenite, so that the austenite grains after hot rolling are fine and the ferrite crystal grains obtained by transformation of austenite are also fine. This alloying element addition method (iii) is often used in combination with the high reduction rolling method (i) and/or controlled rolling method (ii) mentioned above. This alloying element addition method (iii) is also effective in suppressing ferrite grain growth during heat treatment as well. However, this method has a problem in that it causes reductions in austenite volume fraction although it reduces the ferrite crystal grain size; further, the method is yet unsatisfactory in suppressing ultra fine ferrite crystal grains from growing during welding or hot-dip Zn plating. Therefore, the method is applicable only to limited steel species. In addition, the material cost goes up due to the alloying element(s) to be added.

A prior art referring to these high reduction rolling method (i), controlled rolling method (ii) and alloying element addition method (iii), is disclosed in Patent Document 1. In that document, a method is disclosed which comprises finishing working in one or more passes at a total reduction of 50% or higher within 1 second in a temperature range of $Ar_1+50°$ C. to $Ar_3+100°$ C. and carrying out forced cooling, after finishing of the working, within a temperature range of not lower than 600° C. at a cooling rate of not lower than 20° C./second.

Further, Patent Document 2 discloses a method which comprises carrying out rolling passes in at least 5 stands within the dynamic recrystallization temperature range, with the temperature difference between the first stand entry side and the last stand outlet side being not greater than 60° C.

[Patent Document 1] JP-S59-205447-A
[Patent Document 2] JP-H11-152544-A

DISCLOSURE OF INVENTION

Problems to be Solved

However, even when steel sheets having a fine crystal microstructure are obtained by such methods, the microstructure is low in thermal stability. Therefore, even if the microstructure is rendered fine and the mechanical characteristics are improved, the subsequent step of welding of steel sheets or hot-dip plating of steel sheets readily results in coarsening of crystal grains due to heating in that step and the mechanical characteristics of the sheets are seriously impaired; this is another problem. Further, when these hot-rolled steel sheets are subjected to cold rolling and heat treatment to give thin steel sheets, a further problem arises, namely the heat treatment readily results in coarsening of crystal grains and cold-rolled steel sheets having a fine microstructure can scarcely be obtained.

It is an objective of the present invention to provide a hot-rolled or cold-rolled steel sheet excellent in thermal stability and mechanical characteristics and capable of enduring the heat during welding or hot-dip plating, and a method of producing the same.

Means for Solving the Problems

The present inventors made various investigations and experiments concerning the mechanical characteristics and thermal stability of the fine ferrite crystal grain microstructure and, as a result, found that, in order to attain both good mechanical characteristics and good thermal stability, it is most important (a) for the average ferrite crystal grain diameter to be kept within a certain specific range and (b) to set an upper limit to the product D·X ($\mu m^2$/min) of the increase rate X ($\mu m$/min) in average ferrite crystal grain diameter D ($\mu m$) at temperatures in the vicinity of about 700° C. just below the $A_1$ point and that average crystal grain diameter D ($\mu m$). They also found that, in order to attain better thermal stability, it is preferable (c) to retain the ferrite crystal grain distribution within a certain specific range and/or for no strains resulting from rolling to be left within ferrite crystal grains. Further, they found that steel sheets obtained by taking such findings into consideration, when cold-rolled and then heat-treated, can again acquire a ferrite crystal grain microstructure thermally stable and fine in the same manner as mentioned above. Then, they made various investigations and experiments in search of (d) a novel method of producing hot-rolled or cold-rolled steel sheets having such a microstructure and such characteristics. Furthermore, as regards welded members, they found (e) that, in fusion welding, it is preferable to specify the hardness balance in the weld and (f) that, in resistance welding, it is preferable to strive for attaining a hardness balance and preventing embrittlement in the weld.

In the following, the findings and results of investigations and experiments with regard to the above-mentioned items (a) to (f), which have led to completion of the present invention, are described in detail.

(a) Re: To keep the average ferrite crystal grain diameter within a specific range:

As the ferrite crystal grain diameter increases, the strength increases. It was found, however, that when the crystal grains become too small, the driving force for grain growth owing to grain boundary energy becomes increased and, as a result, the grain growth at high temperatures is promoted. More specifically, it was revealed that when the average crystal grain diameter is smaller than 1.2 $\mu m$, it becomes difficult to control the grain growth at high temperatures and, conversely, when the average crystal grain diameter is in excess of either the value of $2.7+5000/(5+350 \cdot C+40 \cdot Mn)^2$ $\mu m$ or the value of 7 $\mu m$ in the case of hot-rolled steel sheets or, in the case of cold-rolled steel sheets, in excess of either the value of $5.0-2.0 \cdot Cr+5000/(5+350 \cdot C+40 \cdot Mn)^2$ $\mu m$ or the value of 9.3 $\mu m$, satisfactory improvements in mechanical characteristics as a result of rendering the microstructure fine can no longer be expected. Therefore, in order to attain both satisfactory mechanical characteristics and good thermal stability simultaneously, it is necessary to employ the value of 1.2 $\mu m$ as the lower limit to the average ferrite crystal grain diameter and, as the upper limit thereto, the value smaller of the value of $2.7+5000/(5+350 \cdot C+40 \cdot Mn)^2$ $\mu m$ and the value of 7 $\mu m$ in the case of hot-rolled steel sheets or, in the case of cold-rolled steel sheets, the value smaller of the value of $5.0-2.0 \cdot Cr+5000/(5+350 \cdot C+40 \cdot Mn)^2$ $\mu m$ and the value of 9.3 $\mu m$.

(b) Re: To set an upper limit to the product D·X of the increase rate X in average ferrite crystal grain diameter D at temperatures in the vicinity of about 700° C. just below the $A_1$ point:

The rate of ferrite crystal grain growth at high temperatures increases with the increase in temperature. Generally, the temperature range in which the ferrite grain growth problem arises during welding or hot-dip plating is a temperature range from just below the $A_1$ point (about 730° C.) to the vicinity of the $A_3$ point and, within this temperature range, the rate of ferrite grain growth varies markedly. However, since it was revealed that the temperature characteristics of the grain growth rate in steel sheets of which the average ferrite crystal grain diameter is within the range specified at the item (a) above are determined by the rate of ferrite grain growth at temperatures in the vicinity of 700° C., it was found that when an upper limit is set to the rate of ferrite grain growth at temperatures in the vicinity of 700° C., namely to the product D·X ($\mu m^2$/min) of the increase rate X ($\mu m$/min) in average ferrite crystal grain diameter D ($\mu m$) and the average crystal grain diameter D ($\mu m$), no problems will occur even when heating is made at higher temperatures during welding or hot-dip plating. And, as a result of experiments, it was revealed that it is necessary to set the product D·X at 0.1 $\mu m^2$/min or below. The product D·X is preferably not higher than 0.07 $\mu m^2$/min, and more preferably not higher than 0.05 $\mu m^2$/min.

(c1) Re: To retain the ferrite crystal grain distribution within a specific range and to leave none of the strains resulting from rolling within ferrite crystal grains:

The ferrite crystal grain diameter distribution and the strains within ferrite crystal grains are closely associated with the grain growth at high temperatures. The grain growth at high temperatures occurs with the grain boundary energy and strains within grains serving as driving forces. Therefore, when relatively large ferrite crystal grains coexist in a fine ferritic microstructure, the large ferrite crystal grains readily integrate with surrounding fine ferrite crystal grains utilizing the boundary as a driving force. When there are strains within ferrite crystal grains, the intragranular strains serve as driving forces to readily unify neighboring ferrite crystal grains with each other. In this manner, the grain growth proceeds rapidly. Therefore, in order to prevent the rapid progress of grain growth, it is preferred that, in addition to rendering ferrite crystal grains fine, the ferrite crystal grain diameter distribution be such that at least 80% of the grains have a diameter falling within the range of ⅓ to 3 times the average crystal grain diameter. This crystal grain diameter distribution is measured at a specified depth from the sheet surface or within the range of 100 $\mu m$ from that depth. This is because, while the crystal grain diameter in the steel sheet obtained according to the method of the invention varies in the direction of sheet thickness, as described later herein, the mild changes in crystal grain diameter in such direction of sheet thickness does not influence the growing behavior of grains. The intragranular dislocation density indicative of the strains within ferrite crystal grains is preferably not higher than $10^9/cm^2$, and more preferably not higher than $10^8/cm^2$. Further, the ferrite grains are preferably equiaxed in shape.

(c2) Re: Ferrite grain diameter distribution in the direction of sheet thickness:

A gentle ferrite grain diameter distribution in the direction of sheet thickness which shows a tendency for the grains to become finer from the central portion of the steel sheet to the steel sheet surface layer is preferred from the view-point of improvements in steel sheet workability, for example in hole expandability or bendability. The ferritic microstructure rendered fine in the surface layer also contributes to improvements in steel sheet surface treatability, for example in chemical treatability or platability. Therefore, in the case of hot-rolled steel sheets, it is preferred that the average crystal grain diameter Ds (μm) at the depth of 1/16 of the sheet thickness from the steel sheet surface, the average crystal grain diameter D (μm) at the depth of 1/4 of the sheet thickness from the steel sheet surface and the average crystal grain diameter Dc (μm) in the central portion of the sheet thickness satisfy the relations Ds≦0.75Dc and D≦0.9Dc and, in the case of cold-rolled steel sheets, it is preferred that the relation Ds≦0.9Dc be satisfied.

(d) Re: Novel method in order to produce hot-rolled steel sheets having the microstructure and characteristics mentioned in the items (a) to (c) above:

By employing the method of rolling in a high temperature range as described below, it becomes possible to provide an easy and high-productivity industrial method of rolling.

First, multi-pass hot rolling is started from the austenite temperature range, and the final rolling pass is finished at a high temperature not lower than the $Ar_3$ point and not lower than 780° C. On that occasion, strains are accumulated within austenite crystal grains.

And, within 0.4 second directly after the finish of hot rolling, cooling to a temperature not higher than 720° C. is completed. On that occasion, the strains are suppressed from being relieved during cooling and the strains remain accumulated within austenite grains and, at temperatures not higher than 720° C., the transformation of austenite to ferrite first becomes active and a large number of ferrite crystal grains are generated with the accumulated strains serving as nuclei, forming a fine ferritic microstructure. According to this method, the shear strains introduced into the steel sheet during hot rolling as a result of friction between the steel sheet surface and the rolling roll surface can also be suppressed from being relieved, so that a larger number of ferrite nuclei are generated in the portion closer to the surface than in the sheet thickness center portion.

Further, thereafter, the steel sheet is maintained in a temperature range of 600 to 720° C. for at least 2 seconds. By this measure, it becomes possible to obtain a desired ferritic microstructure with crystal grains fine in diameter being distributed in a narrow range and, at the same time, the strains are suppressed from remaining in the fine ferritic microstructure after transformation. Further, the above-mentioned changes in the amount of ferrite nuclei formed in the direction of sheet thickness contribute to the formation of a microstructure showing a moderate grain diameter gradient from the sheet thickness center to the surface.

As for the cooling conditions just after completion of the hot rolling, it is necessary that the cooling to a temperature of 720° C. or below be finished within 0.4 second, as described above. In the prior art, cooling is started after the lapse of at least 0.2 second, at the speediest, just after completion of the rolling, and the rate of cooling was at most about 250° C./second. In the case of a low-carbon steel species whose $Ar_3$ point is 800° C., for instance, the prior art requires at least 0.52 second for cooling from 800° C. or above to a temperature not higher than 720° C. even when the hot rolling of the low-carbon steel is finished at the $Ar_3$ point; thus, in the art, it is difficult to finish the cooling to 720° C. or below within 0.4 second.

When a hot-rolled steel sheet having such a microstructure as described in the items (a) to (c) above is cold rolled and then heat-treated at a temperature not higher than the temperature ($Ac_3$) at which an austenitic single phase is formed, a fine-grained ferritic microstructure having the characteristics mentioned above is again obtained. This is presumably due to (1) a generation of a large number of ferrite nuclei caused by a generation, on abundantly existing ferrite grain boundaries resulting from hot rolling, of nuclei for recrystallization of processed ferrite during heat treatment after cold rolling and (2) simultaneous generation of a large number of austenite grains on ferrite grain boundaries to suppress the growth of ferrite nuclei. As a result, the ferrite grain diameter is almost the same as or larger only by 1 to 3 μm than the ferrite diameter obtained upon hot rolling and, thus, a microstructure inheriting the characteristics acquired on the occasion of hot rolling is obtained. Therefore, when a ferrite crystal grain diameter distribution in the direction of sheet thickness is found in the stage of hot-rolled steel sheets, as in accordance with the present invention, a good ferrite crystal grain diameter distribution in the direction of sheet thickness can appear even after cold rolling and heat treatment. While the heat treatment temperature may be at a level of $Ac_1$ or below, a long period of time is required for the recrystallization of processed ferrite. At a temperature not lower than $Ac_1$ at which an austenitic single phase appears, the microstructure tends to become coarsened with ease.

(e) Re: To specify the hardness balance at the weld in fusion welding:

In arc welding in which the heat input on the occasion of welding is large, it goes without saying that, from the viewpoint of preventing the heat-affected zone (HAZ) from being softened, it is preferable to form a highly thermally stable microstructure scarcely causing grain growth during welding. Furthermore, in order to secure the workability of a member after welding, it is preferable to specify the hardness balance of the weld and thereby improve the fusion weldability. Thus, as regards the chemical composition, it is possible to obtain a weldable part excellent in fusion weldability by prescribing that the carbon equivalent Ceq(I), which is defined by Ceq(I)=C+Mn/6+Si/24+Cr/5+Mo/4+Ni/40+V/14, should be 0.06 to 0.6%. The fusion weldability refers to such characteristic that the difference between the maximum hardness of the weld obtained by using a welding method which proceeds with continuous molten pool forming and molten pool solidification, such as in arc welding or laser beam welding, and the hardness of the base metal or the hardness of the most softened part of the weld is small and that the weld is prevented from being embrittled, hence the workability of the member after welding can be secured.

(f) Re: To strive for attaining a hardness balance and preventing the weld from being embrittled in resistance welding:

In resistance welding as well, in which welding is effected by electrothermal heating of the base metal, it goes without saying that it is preferable to form a highly thermally stable microstructure scarcely causing grain growth during welding. Furthermore, it is preferable to strive for attaining a hardness balance and preventing embrittlement in the weld. Thus, as regards the chemical composition, it is possible to obtain a weldable part excellent in resistance weldability by prescribing that the carbon content should be C≦0.17 and that the carbon equivalent Ceq(II), which is defined by Ceq(II)=C+Mn/100+Si/90+Cr/100, should be 0.03 to 0.20% and, further, that the indicator Rsp of the base metal resistance, which is defined by Rsp=13.5×(Si+Al+0.4Mn+0.4Cr)+12.2, should be not higher than 45 so that sufficient weld nuggets for securing the joint strength may be obtained within a broad range of welding conditions. The resistance weldability refers to such characteristic that a sufficient level of joint strength (the so-called maximum breaking force at button breakage) can be secured within a broad range of welding conditions.

The present invention has been completed based on such findings and investigational and experimental results. The present invention consists in a hot-rolled steel sheet as defined below in any of the items (1), (2), (4) to (7) and (9) to (11), a cold-rolled steel sheet as defined below in any of items (3) to (6) and items (8) to (11) and, further, a method of hot-rolled steel sheet production as defined below under any of items (12) and (14) and a method of cold-rolled steel sheet production as defined below under any of items (13) and (14). Hereinafter, the inventions defined under those items are respectively referred to as the inventions (1) to (14). The inventions (1) to (14) are sometimes collectively referred to as the present invention.

The carbon steel or low-alloy steel to be used in the practice of the invention preferably contains 0.01 to 0.25% of C and may further contain one or more elements selected from among Si, Mn, Al, P, Ti, Nb, V, Cr, Cu, Mo, Ni, Ca, REM and B.

Item (1)

A hot-rolled steel sheet of carbon steel or low-alloy steel, the main phase of which is ferrite, and is characterized in that the average ferrite crystal grain diameter D (μm) at the depth of ¼ of the sheet thickness from the steel sheet surface satisfies the relations respectively defined by the formulas (1) and (2) given below and, at the same time, the increase rate X (μm/min) in average ferrite crystal grain diameter at 700° C. at the depth of ¼ of the sheet thickness from the steel sheet surface and the above-mentioned average crystal grain diameter D (μm) satisfy the relation defined by the formula (3) given below:

$$1.2 \leq D \leq 7 \quad \text{formula (1)}$$

$$D \leq 2.7 + 5000/(5+350 \cdot C + 40 \cdot Mn)^2 \quad \text{formula (2)}$$

$$D \cdot X \leq 0.1 \quad \text{formula (3)}$$

Here, C and Mn indicate the contents (in % by mass) of the respective elements in the steel.

Item (2)

A hot-rolled steel sheet according to item (1) above, characterized in that, at the depth of ¼ of the sheet thickness from the steel sheet surface, the area percentage of ferrite crystal grains the crystal grain diameter d (μm) of which satisfies the relation defined by the formula (4) given below amounts to at least 80%:

$$D/3 \leq d \leq 3D \quad \text{formula (4)}$$

Here, D represents the average ferrite crystal grain diameter (μm) at the depth of ¼ of the sheet thickness from the steel sheet surface.

Item (3)

A cold-rolled steel sheet of carbon steel or low-alloy steel, the main phase of which is ferrite, and is characterized in that the average ferrite crystal grain diameter D (μm) at the depth of ¼ of the sheet thickness from the steel sheet surface satisfies the relations respectively defined by the formulas (5) and (6) given below and, at the same time, the increase rate X (μm/min) in average ferrite crystal grain diameter at 700° C. at the depth of ¼ of the sheet thickness from the steel sheet surface and the above-mentioned average crystal grain diameter D (μm) satisfy the relation defined by the formula (3) given below:

$$1.2 \leq D \leq 9.3 \quad \text{formula (5)}$$

$$D \leq 5.0 - 2.0 \cdot Cr + 5000/(5+350 \cdot C + 40 \cdot Mn)^2 \quad \text{formula (6)}$$

$$D \cdot X \leq 0.1 \quad \text{formula (3)}$$

and, further, that, at the depth of ¼ of the sheet thickness from the steel sheet surface, the area percentage of ferrite crystal grains the crystal grain diameter d (μm) of which satisfies the relation defined by the formula (4) given below amounts to at least 80%:

$$D/3 \leq d \leq 3D \quad \text{formula (4)}$$

Here, C, Cr and Mn represent the contents (in % by mass) of the represent element in the steel.

Item (4)

A hot-rolled or cold-rolled steel sheet according to any of items (1) to (3) above, characterized in that it contains, as a second phase other than ferrite, a total of less than 50% of one or more species selected from the group consisting of less than 50% of bainite, less than 30% of pearlite, less than 5% of granular cementite, less than 5% of martensite and less than 3% of retained austenite and has a yield ratio lower than 0.75, % in each occurrence being % by volume.

Item (5)

A hot-rolled or cold-rolled steel sheet according to any of items (1) to (3) above, characterized in that it contains, as a second phase other than ferrite, 5 to 40% by volume of martensite and has a yield ratio lower than 0.75.

Item (6)

A hot-rolled or cold-rolled steel sheet according to any of items (1) to (3) above, characterized in that it contains, as a second phase other than ferrite, 3 to 30% by volume of retained austenite and has a product, TS×El, of tensile strength TS (MPa) and total elongation El (%) of not less than 18000 (MPa %).

Item (7)

A hot-rolled steel sheet according to any of items (1), (2), (4), (5) and (6) above, characterized in that the average crystal grain diameter Ds (μm) at the depth of ¹⁄₁₆ of the sheet thickness from the steel sheet surface, the average crystal grain diameter D (μm) at the depth of ¼ of the sheet thickness from the steel sheet surface and the average crystal grain diameter Dc (μm) at the center of the sheet thickness satisfy the relations Ds≤0.75Dc and D≤0.9Dc.

Item (8)

A cold-rolled steel sheet according to any of items (3) to (6) above, characterized in that the average crystal grain diameter Ds (μm) at the depth of ¹⁄₁₆ of the sheet thickness from the steel sheet surface and the average crystal grain diameter Dc (μm) at the center of the sheet thickness satisfy the relation D≤0.9Dc.

Item (9)

A hot-rolled or cold-rolled steel sheet according to any of items (1) to (8) above, characterized in that the carbon equivalent Ceq(I) defined by the formula (7) given below is 0.06 to 0.6%:

$$Ceq(I)=C+Mn/6+Si/24+Cr/5+Mo/4+Ni/40+V/14 \quad \text{formula (7)}$$

Here, the symbols of elements in the above formula represent the contents (in % by mass) of the respective elements in the steel.

Item (10)

A hot-rolled or cold-rolled steel sheet according to any of items (1) to (8) above, characterized in that the C content is not higher than 0.17% by mass, the carbon equivalent Ceq(II) defined by the formula (8) given below is 0.03 to 0.20% and the base metal resistance indicator Rsp defined by the formula (9) given below is not higher than 45:

$$Ceq(II) = C + Mn/100 + Si/90 + Cr/100 \quad \text{formula (8)}$$

$$Rsp = 13.5 \times (Si + Al + 0.4Mn + 0.4Cr) + 12.2 \quad \text{formula (9)}$$

Here, the symbols of elements in the above formulas represent the contents (in % by mass) of the respective elements in the steel.

Item (11)

A hot-dip-plated hot-rolled or cold-rolled steel sheet characterized in that it comprises a Zn, Al, Zn—Al alloy or Fe—Zn alloy coat layer formed on the surface of a hot-rolled steel sheet according to any of items (1) to (10) above.

Item (12)

A method of producing a hot-rolled steel sheet according to any of items (1), (2), (4), (5), (6), (7), (9), (10) and (11) above by subjecting a carbon steel or low-alloy steel slab to multi-pass hot rolling to give the hot-rolled steel sheet, characterized in that the final rolling pass is finished at a temperature not lower than the $Ar_3$ point and not lower than 780° C. and then the rolled sheet is cooled to 720° C. or below within 0.4 second at a cooling rate of not lower than 400° C./second and then maintained in a temperature range of 600 to 720° C. for at least 2 seconds.

Item (13)

A method of producing a cold-rolled steel sheet according to any of items (3), (4), (5), (6), (8), (9) and (10) above, characterized in that a hot-rolled steel sheet obtained by the method according to item (12) above is pickled, then cold-rolled at a reduction of 40 to 90% and thereafter heat-treated at a temperature of not higher than 900° C.

Item (14)

A method of producing a hot-dip-plated hot-rolled or cold-rolled steel sheet according to item (11) above, characterized in that a hot-rolled steel sheet obtained by the method according to item (12) above is subjected to pickling or to picking and further cold rolling at a reduction of 40 to 90%, and then to hot-dip plating in a continuous hot-dip plating line.

EFFECTS OF THE INVENTION

According to the present invention, a hot-rolled steel sheet and a cold-rolled steel sheet, each having ultra fine crystal grains, having such thermal stability that allows the steel sheet to endure heat during welding or hot-dip plating and, further, excellent in mechanical characteristics as well as a manufacturing method thereof can be provided.

BEST MODES FOR CARRYING OUT THE INVENTION

In the following, the ultra fine crystal grain steel sheet according to the present invention is described. In the following, "%" used in relation to the content of each chemical component means "% by mass".

(A) Re: Chemical Composition:

C:

C is an element useful in promoting the process of rendering ferrite crystal grains fine since it can lower the austenite-to-ferrite transformation temperature and lower the finish temperature in hot rolling. It is also an element in order to secure the strength. Therefore, it is preferred that not lower than 0.01% of C be contained. In order to promote the process of rendering ferrite crystal grains fine, the content is preferably not lower than 0.03%. Since, however, an excessive content may result in retardation of ferrite transformation after hot rolling and in decreases in volume fraction of ferrite and, further, in deterioration in weldability, the content is preferably not higher than 0.25%. In order to improve the workability of the weldable part, the C content is preferably not higher than 0.17%, and more preferably not higher than 0.15%.

Si:

Si is preferably contained in order to improve the strength. However, an excessive content results in marked deterioration in ductility, causing a surface oxidation during hot rolling. Therefore, it is preferable that the content be not higher than 3%, more preferably not higher than 2%, and much more preferably not higher than 1.8%. The lower limit may be an impurity level. In order to form a retained austenite in the ferrite microstructure, the total content of Si+Al is preferably not lower than 1%.

Mn:

Mn is preferably contained in order to secure the desired strength. Further, it makes it possible to lower the austenite-to-ferrite transformation temperature and lower the finish temperature in hot rolling and thus promote the process of rendering ferrite crystal grains fine and, therefore, it is preferable that it be contained in the steel. However, an excessive content causes retardation of the ferrite transformation after hot rolling and lower the volume fraction of ferrite and, therefore, the content is preferably not higher than 3%, more preferably not higher than 2.7%. The lower level may be an impurity level but, in the case of addition for strength improvement, the content is preferably not lower than 0.5%. In order to cause a retained austenite to be formed in the ferrite microstructure, the content is preferably not lower than 0.5%, and more preferably not lower than 0.8%. In order to form martensite in the ferrite microstructure, the content is preferably not lower than 1.5%.

Al:

Al can be added for ductility improvement. However, an excessive content renders austenite unstable, making it necessary to excessively increase the finish temperature in hot rolling and, further, making it difficult to conduct continuous casting stably. Therefore, the content is preferably not higher than 3%. The lower limit may be an impurity level but, in order to cause a retained austenite formation in the ferrite microstructure, the content is preferably such that the total content of Si+Al is not lower than 1%.

P:

P can be added to increases the strength. However, an excessive content causes an embrittlement due to grain boundary segregation and therefore, when it is added, the content is preferably not higher than 0.5%, more preferably not higher than 0.2%, and much more preferably not higher than 0.1%. The lower limit may be an impurity level. Generally, however, an amount of about 0.01% may be intermixed into the steel during steel making process.

Ti:

Ti precipitates out as a carbide or nitride which increases the strength and, further, this precipitate prevents austenite or ferrite from becoming coarse, thus promotes the process of rendering crystal grains fine during hot rolling and pre-vents grain growth during heat treatment; therefore, it can be added. However, an excessive content causes the formation of a large amount of coarse Ti carbide or nitride during heating prior to hot rolling, which impairs the ductility and/or workability; therefore, the content is preferably not higher than 0.3%. In order to facilitate the formation of ferrite, it is preferably added in an amount such that the total content of Ti+Nb is not higher than 0.1%, more preferably not higher than 0.03%, and more preferably not higher than 0.01%. The lower limit may be an impurity level but it may be generally intermixed into the steel in an amount of about 0.001% during steel making process.

Nb:

Nb precipitates out as a carbide or nitride which increases the strength and, further, this precipitate prevents austenite or ferrite from becoming coarse, thus promotes the process of rendering crystal grains fine during hot rolling and prevents grain growth during heat treatment; therefore, it can be added. However, an excessive content causes the formation of a large amount of coarse NbC during heating prior to hot rolling, which impairs the ductility and/or workability; therefore, the content is preferably not higher than 0.1%. In order to facilitate the formation of ferrite, it is preferably added in an amount such that the total content of Ti+Nb is not higher than 0.1%, more preferably not higher than 0.03%, and much more preferably not higher than 0.01%. The lower limit may be an impurity level. Generally, however, it may be intermixed into the steel in an amount of about 0.001% during steel making process.

V:

V precipitates out as a carbide and increases the strength and, further, this precipitate prevents ferrite from becoming coarse and thus promotes the process of rendering crystal grains fine; therefore, it can be added. However, for the same reasons as in the case of Ti or Nb, it impairs the ductility and/or workability and, therefore, the content is preferably not higher than 1%, more preferably not higher than 0.5%, and much more preferably not higher than 0.3%. The lower limit may be an impurity level. Generally, however, it may be intermixed into the steel in an amount of about 0.001% during steel making process.

Cr:

Cr is effective in increasing the hardenability and causing the formation of martensite or bainite in the ferrite microstructure and, therefore, it can be added for obtaining such effects. However, an excessive content prevents the formation of ferrite and, therefore, the content is preferably not higher than 1%. The lower limit may be an impurity level. Generally, however, it may be intermixed into the steel in an amount of about 0.02% during steel making process.

Cu:

Cu precipitates out at low temperatures and shows an effect of increasing the strength; hence it can be added for producing these effects. However, it may possibly cause grain boundary cracking of the slab and, therefore, the content is preferably not higher than 3%, and more preferably not higher than 2%. When it is added, the content is preferably not lower than 0.1%. The lower limit may be an impurity level. Generally, however, it may be intermixed into the steel in an amount of about 0.02% during steel making process.

Ni:

Ni can be added in order to increase the stability of austenite at high temperatures. Further, when the steel also contains Cu, Ni can be added in order to prevent a grain boundary embrittlement of the slab. However, an excessive content suppresses the formation of ferrite, so that the content is preferably not higher than 1%. The lower limit may be an impurity level. Generally, however, it may be intermixed into the steel in an amount of about 0.02% during steel making process.

Mo:

Mo precipitates out as MoC and increases the strength and, further, this precipitate suppresses the coarsening of ferrite and promotes the process of rendering crystal grains fine; therefore, it can be added. However, for the same reasons as in the case of Ti and Nb, it impairs the ductility and workability and, therefore, the content is preferably not higher than 1%, more preferably not higher than 0.5%, and much more preferably not higher than 0.3%. The lower limit may be an impurity level. Generally, however, it may be intermixed into the steel in an amount of about 0.001% during steel making process.

Ca, REM, B:

Ca, rare earth metals (REM) or B renders finer oxides or nitrides precipitated during solidification and maintain the soundness of the slab; therefore, one or more of them can be added. However, they are expensive, so that the total content is preferably not higher than 0.005%. The lower limit may be an impurity level.

Other "impurities" which may be intermixed into the steel are S, N and Sn. As regards S and N, it is desirable that the contents be controlled in the following manner, if possible.

S:

S is an impurity element that forms a sulfide inclusion and lowers the workability, and, therefore, it is desirable that the content be not higher than 0.05%. When it is desired that a much higher level of workability be secured, the content of S is preferably not higher than 0.008%, and more preferably not higher than 0.003%.

N:

N is an impurity element that decreases the workability, and it is desirable that the content be suppressed to 0.01% or lower, and more preferably to 0.006% or lower.

(B) Re: Microstructure of the Steel Sheet According to the Present Invention

The steel sheet according to the present invention is a steel sheet comprising the main phase, which is ferrite, and a second phase other than ferrite. The "main phase" so referred to herein means the phase forming the largest proportion of the microstructure among the phases constituting the microstructure. The volume fraction of the main phase ferrite is preferably at least 50%, and more preferably not smaller than 60%. When the volume fraction of ferrite is smaller than 50%, the ductility and/or workability of the steel sheet may be impaired in some instances.

The ferrite crystal grain size (diameter) exerts great influences on the mechanical characteristics and thermal stability and, further, workability of the steel sheet.

Therefore, in order to secure sufficient levels of strength, ductility, thermal stability and, further, workability for the hot-rolled steel sheet according to the present invention, it is necessary that the average ferrite crystal grain diameter D (μm) at the depth of ¼ of the sheet thickness from the steel sheet surface be within a specific range within which the relations defined by the following formulas (1) and (2) are satisfied:

$1.2 \leq D \leq 7$      formula (1)

$D \leq 2.7 + 5000/(5 + 350 \cdot C + 40 \cdot Mn)^2$      formula (2)

Thus, the specific range is a range such that the lower limit is 1.2 μm and the upper limit is the smaller value of $2.7+5000/(5+350 \cdot C+40 \cdot Mn)^2$ μm and 7 μm.

In order to secure sufficient levels of strength, ductility, thermal stability and, further, workability for the cold-rolled steel sheet according to the present invention, it is necessary that the average ferrite crystal grain diameter D (μm) at the depth of ¼ of the sheet thickness from the steel sheet surface be within a specific range within which the relations defined by the following formulas (5) and (6) are satisfied:

$$1.2 \leq D \leq 9.3 \quad \text{formula (5)}$$

$$D \leq 5.0 - 2.0 \cdot Cr + 5000/(5+350 \cdot C + 40 \cdot Mn)^2 \quad \text{formula (6)}$$

Thus, the specific range is a range such that the lower limit is 1.2 μm and the upper limit is the smaller value of $5.0-2.0 \cdot Cr+5000/(5+350 \cdot C+40 \cdot Mn)^2$ μm and 9.3 μm.

The reason why the lower limit to the average ferrite crystal grain diameter D is herein set at 1.2 μm is that when the diameter D is smaller than 1.2 μm, the work hardening coefficient decreases to an extreme and not only the ductility and/or workability is deteriorate but also the thermal stability of the fine ferrite microstructure is deteriorated and thus grains readily grow at high temperatures. In order to obtain still higher levels of ductility, workability and thermal stability, the lower limit to the average ferrite crystal grain diameter D is preferably set at 1.5 μm. On the other hand, the reason why the upper limit to the average ferrite crystal grain diameter D is set at the smaller value of $2.7+5000/(5+350 \cdot C+40 \cdot Mn)^2$ μm and 7 μm for hot-rolled steel sheets or at the smaller value of $5.0-2.0 \cdot Cr+5000/(5+350 \cdot C+40 \cdot Mn)^2$ μm and 9.3 μm for cold-rolled steel sheets is that when the diameter D is in excess of any of these values, it is no more possible to obtain sufficient levels of strength. In order to obtain still higher levels of strength, it is preferable that the upper limit to the average ferrite crystal grain diameter D be set at the smaller value of $2.4+5000/(5+350 \cdot C+40 \cdot Mn)^2$ μm and 5.5 μm for hot-rolled steel sheets or at the smaller value of $4.5+5000/(5+350 \cdot C+40 \cdot Mn)^2$ μm and 8.5 μm for cold-rolled steel sheets. Here, a region surrounded by large angle grain boundaries having a crystal orientation difference not smaller than 15° is defined as one crystal grain while grain boundaries smaller in angle than 15° are neglected.

In order to further increase the thermal stability of the steel sheet, it is preferable that the ferrite crystal grain diameter distribution be within a specific range. A cause of the growth of grains at high temperatures is the grain boundary energy-based driving force and, when relatively large ferrite crystal grains coexist in a fine ferrite microstructure, the large ferrite crystal grains readily become united with surrounding fine ferrite crystal grains with the grain boundary serving as a driving force, whereby the grain growth progresses rapidly. Therefore, in order to reduce the rate of ferrite crystal grain growth at high temperatures, it is preferable, in addition to rendering ferrite crystal grains fine in order to keep the average crystal grain diameter D (μm) within a specific range in which the relations defined by the formulas (1) and (2) given above are satisfied, that those crystal grains the crystal grain diameter d (μm) of which satisfies the relation defined by the formula (4) given below amount to at least 80% in area fraction among the ferrite grains at the depth of ¼ of the sheet thickness from the steel sheet surface:

$$D/3 \leq d \leq 3D \quad \text{formula (4)}$$

In other words, it is preferred that the grain diameter distribution be such that 80% or more, in area fraction, of the ferrite crystal grains fall within the range of from one third of to 3 times the average crystal grain diameter D (μm). It is more preferred that the grain diameter distribution be such that 85% or more of the ferrite crystal grains fall within the range of from ⅓ of to 3 times the average crystal grain diameter D (μm), and much more preferably such that 90% or more of the ferrite crystal grains fall within the range of from ⅓ of to 3 times the average crystal grain diameter D (μm).

The reason why the ferrite crystal grain diameter and distribution are defined at the depth of ¼ of the sheet thickness is that the ferrite crystal grain diameter in the hot-rolled steel sheet according to the present invention varies in the direction of sheet thickness. When the ferrite crystal grain microstructure at that depth is maintained within the range mentioned above, the steel sheet according to the present invention can secure the desired levels of mechanical characteristics and thermal stability. In particular, the thermal stability of the grain diameter depends not on the grain diameter distribution as statistically determined in a wide range from the sheet surface to the inside but on the grain diameter distribution as statistically determined at a specific depth. Therefore, the statistical microstructure observation should be carried out in a cross-section at the depth of ¼ of the sheet thickness and parallel to the surface or, if the observation is carried out in a section perpendicular to the surface, in a region at the depth of ¼ of the sheet thickness ±100 μm at the most.

The second phase other than ferrite may be any phase known to be generally formed in low-carbon steel materials, for example pearlite, cementite, bainite, martensite, retained austenite and/or carbonitrides of elements other than Fe.

In order to efficiently produce steel sheets excellent in mechanical characteristics and thermal stability, with a yield ratio of not lower than 0.75, it is preferred that the second phase comprises a total amount smaller than 50%, more preferably smaller than 40%, of one or more species selected from the group consisting of less than 50% of bainite, less than 30% of pearlite, less than 5% of granular cementite, less than 5% of martensite and less than 3% of retained austenite, each % being percent by volume. When the volume fractions of bainite, pearlite and granular cementite are in excess of the respective values mentioned above, the workability is impaired. When the volume fractions of martensite and retained austenite are in excess of the respective values mentioned above, it becomes difficult to attain a yield ratio of not lower than 0.75.

Then, in order to efficiently produce steel sheets excellent in mechanical characteristics and thermal stability, with a yield ratio of lower than 0.75, it is preferred that the second phase comprises 5 to 40% by volume of martensite. In this case, it is preferred that the volume fractions of bainite, pearlite and granular cementite be as low as possible. Retained austenite may be present but, in order to lower the yield ratio with ease, the volume fraction is preferably not higher than 3%.

In order to efficiently produce steel sheets excellent in elongation characteristics, in particular, with the product of tensile strength TS and total elongation El being not smaller than 18000, and also excellent in thermal stability, 3 to 30% by volume of retained austenite is caused to be contained as the second phase. When the retained austenite content is lower than 3% by volume, the elongation characteristics may possibly be impaired and, when it is in excess of 30%, the thermal stability may possibly be impaired. The volume fraction of retained austenite to be contained as the second phase is preferably 5 to 25%.

The second phase other than ferrite may further comprise, in addition to those mentioned above, trace amounts, not larger than 1% by volume, of carbides, nitrides and oxides. As such, there may be mentioned carbonitrides of Ti, Nb, V and Mo.

(C) Re: Grain Growth Rate at High Temperatures

The temperature characteristics of the grain growth rate in steel sheets in which the average ferrite crystal grain diameter is within a specific range so as to satisfy the relations defined by the formulas (1) and (2) given hereinabove depend on the rate of ferrite grain growth at temperatures in the vicinity of 700° C. Therefore, it becomes necessary that the increase rate X (μm/min) in average ferrite crystal diameter at 700° C. at the depth of ¼ of the sheet thickness from the steel sheet surface and the above-mentioned average crystal grain diameter D (μm) satisfy the relation defined by the following formula (3):

$$D \cdot X \leq 0.1 \qquad \text{formula (3)}$$

Thus, when the product D·X (μm²/min) of the increase rate X (μm/min) in average ferrite crystal grain diameter and the average crystal grain diameter D (μm) is maintained at a level not higher than 0.1 μm²/min, the steel sheet becomes stable against the main thermal history during welding or hot-dip plating and, accordingly, good thermal stability can be obtained. For better thermal stability, the product D·X is preferably maintained at 0.07 μm²/min or below, more preferably at 0.05 μm²/min or below.

As shown in Examples 2 and 3 given later herein, the ferrite crystal grain microstructure of a steel sheet for which the product D·X (μm²/min) of the increase rate X (μm/min) in average ferrite crystal grain diameter and the average crystal grain diameter D (μm) is not higher than 0.1 μm²/min shows almost no changes in grain diameter even upon tens of seconds of treatment at 850° C. The ferrite crystal grain size (diameter) of the steel sheet according to the present invention increases almost proportionally to the time at 700° C., unlike the ordinary grain growth which is proportional to the square root of the time. Therefore, the increase rate X (μm/min) in average ferrite crystal grain diameter is determined by measuring changes in grain diameter at 700° C. for about 1 hour and calculating the mean rate of change.

In order to further decrease the grain growth rate, the dislocation density in ferrite crystal grains is kept preferably at a level not higher than $10^9/cm^2$, more preferably not higher than $10^8/cm^2$.

(D) Re: Zn Plating:

The fine-grained hot-rolled steel sheet having the above-mentioned microstructure and thermal stability can be provided with a coat of Zn, Zn—Al alloy, Al—Si alloy or Fe—Zn alloy, for instance, on the steel sheet surface using a hot-dip plating line.

As for the Zn—Al alloy plating bath composition, a Zn-(0.1 to 60%) Al bath, a composite bath derived by further addition of Si and/or Mg, or the like is used. As for the Al—Si alloy plating bath composition, an Al-(7 to 13%) Si bath, for instance, is used. In the plating bath, there may be contained at most 0.1% of Fe, V, Mn, Ti, Nb, Ca, Cr, Ni, W, Cu, Pb, Sn, Cd and/or Sb, without causing any trouble. The coat film on the steel sheet surface after cooling following plating generally has a composition somewhat higher in Fe concentration as compared with the plating bath composition since mutual diffusion of elements occurs between the steel material and the molten metal during dipping and cooling. The technique of hot-dip alloying zinc plating positively utilizes this mutual diffusion, and the Fe concentration in the coat film amounts to 7 to 15%. The amount of the coating metal is not particularly restricted but preferably is 30 to 200 g/m² per side surface; in the case of hot-dip alloying zinc plating, in order to avoid a possibility of powdering, the amount is preferably 25 to 60 g/m².

The method of plating using a hot-dip plating line is as described below.

The hot-rolled steel sheet after attaining a fine-grained microstructure is passed through a pickling step for scale removal from the surface layer and then enters a continuous hot-dip zinc plating line. After alkali degreasing and washing with water, in that order from the entry side, the steel sheet is preheated and then heated at a temperature of 550 to 900° C. in a hydrogen-containing atmosphere for the reduction of Fe oxides on the steel sheet surface to prepare a surface suited for the subsequent plating treatment. At temperatures below 550° C., the progress of reduction is insufficient and, on the other hand, heating to a temperature exceeding 900° C. results in coarsening of the ferritic microstructure. When a ferrite+pearlite microstructure or a ferrite+cementite microstructure is desired after plating, a temperature range of from 550° C. to about 730° C. is preferably employed. On the other hand, when bainite, martensite or retained austenite, for instance, is to be formed, the temperature is preferably raised to a temperature range from the $A_1$ point to 900° C. in which the two phases, namely ferrite and austenite, can coexist. The hydrogen content in the atmosphere is preferably 5 to 40%. When the hydrogen content is lower than 5%, the reduction proceeds only to an insufficient extent. At levels exceeding 40%, the atmospheric gas cost becomes unduly high. The component other than hydrogen may be any gas that will not suppress the reduction. From the cost viewpoint, nitrogen is preferred. The period of soaking is only required to be such that the reduction can proceed sufficiently; hence it is not particularly specified but generally it is not shorter than 10 seconds. The upper limit is 5 minutes at the longest, more preferably 2 minutes at the longest, so that ferrite coarsening may be avoided. After passing the heating and soaking zone for this reduction, the steel sheet is cooled to a temperature in the vicinity of the plating bath temperature, dipped in the plating bath and, after adjustment to a predetermined coating weight, cooled to room temperature. In the case of alloying hot-dip zinc plating, the steel sheet after hot-dip zinc plating in the above manner is reheated to 470 to 600° C. so that the substrate iron and the coat film may react with each other to form an Fe—Zn alloy layer on the steel sheet surface.

In this way, the steel sheet subjected to hot-dip plating is not only heated in the plating bath but also heat-treated at high temperatures in the surface oxide layer reduction step prior to dipping in the plating bath and in the alloying step after dipping in the plating bath. Since, however, the steel sheet according to the present invention has a thermally stable ferritic microstructure, it retains the fine-grained microstructure and shows good mechanical characteristics even after passing those steps. Furthermore, the ferrite grains on the surface are fine, so that the alloying reaction rate increases and, therefore, the plated sheet can be produced efficiently and advantageously.

When it is to be plated, the steel preferably has a composition such that the C content is 0.001 to 0.15%, the Si content is 0.005 to 1.5% and/or P content is 0.005 to 1.0%.

(E) Re: Weldability:

The steel sheets having a fine-grained microstructure produced by the prior art low-temperature rolling are inferior in thermal stability and allow the HAZ to become softened and, therefore, the characteristics of the weld become deteriorated. On the contrary, the thermal stability of the steel sheet according to the invention is still good, even after joining by welding, in the form of the steel sheet as such or surface-coated in the above manner to itself or to another member, thus improving the formability of the weld after welding by the laser, spot or arc welding method, for instance.

As regards the chemical composition of the steel sheet to be subjected to fusion welding, typically arc plasma welding or laser welding, it is preferable to prescribe that the carbon equivalent Ceq(I) defined by the formula (7) given below should be 0.06 to 0.6%:

$$Ceq(I)=C+Mn/6+Si/24+Cr/5+Mo/4+Ni/40+V/14 \quad \text{formula (7)}$$

Here, the symbols of elements in the above formula represent the contents (in % by mass) of the respective elements in the steel.

Ceq(I) is an indicator of the maximum hardness of the weld and, by pre-scribing that Ceq(I) should be 0.06 to 0.6%, the formability of the member after welding can be secured. When Ceq(I) is smaller than 0.06%, the hardenability is poor and, therefore, the hardness of the welded metal portion becomes softer than the hardness of the base metal strengthened by a thermally stable fine-grained microstructure and the workability of the weld becomes decreased. And, when it is in excess of 0.6%, the hardening, upon quench hardening, in the welded metal part and the HAZ site having thermal stability is significant as compared with the base metal hardness and, therefore, the formability of the weld decreases. It is preferable to prescribe that Ceq(I) should be 0.10 to 0.5%. Further, it is preferable to prescribe that the content of C, which causes hardening and embrittlement of the weld, should be not higher than 0.17% by mass.

In spot welding in which resistance welding is realized by electricity-based heat generation in the base metal members, it is preferable to prescribe, from the viewpoint of hardness distribution in the weld and prevention of embrittlement in order to secure the joint strength, that, regarding the chemical composition, the C content should be not higher than 0.17% by mass and the carbon equivalent Ceq(II) defined by the formula (8) given below should be 0.03 to 0.20% and, further, in order to obtain a nugget diameter for securing the joint strength within a broad range of conditions, that the indicator Rsp of the base metal resistance defined by the formula (9) given below should be not higher than 45:

$$Ceq(II)=C+Mn/100+Si/90+Cr/100 \quad \text{formula (8)}$$

$$Rsp=13.5\times(Si+Al+0.4Mn+0.4Cr)+12.2 \quad \text{formula (9)}$$

Here, the symbols of elements in the above formulas represent the contents (in % by mass) of the respective elements in the steel.

In a thermal cycle involving rapid cooling, as in spot welding, the influence of the C content on hardening and embrittlement is great, so that the C content is preferably not higher than 0.17%, more preferably not higher than 0.15%.

Ceq(II) is an indicator of the maximum hardness in the weld in such a rapid cooling-involving thermal cycle as in spot welding and, by prescribing that Ceq(II) should be 0.03 to 0.20%, it becomes possible to obtain a weldable part excellent in resistance weldability. When Ceq(II) is lower than 0.03%, the hardenability is poor, the maximum hardness obtainable in the spot-welded portion is low as compared with the base metal hardness and, therefore, the so-called button breakage can be obtained in joint strength evaluation testing but the maximum breaking load attainable is at a low level. When Ceq(II) is in excess of 0.20%, the hardening and embrittlement due to quench hardening in the weld metal portion and the HAZ site having thermal stability are remarkable as compared with the base metal hardness and, in strength evaluation testing, cracking occurs in the molten metal site (within nugget) and it becomes difficult to attain the so-called button breakage. Preferably, it is prescribed that Ceq(II) should be 0.06 to 0.17%.

The indicator Rsp of base metal resistance is indicative of how broad is the range of welding conditions under which a nugget (fusion weld site) diameter for securing the joint strength can be obtained and, in order to obtain a weldable site excellent in resistance weldability, it is preferably not higher than 45, more preferably not higher than 40.

In order to obtain a nugget diameter for securing the joint strength within a broad range of welding conditions, the current density and resistance heating become important factors. Here, the current density is determined by the sectional area of the route of current flow during welding and, in the case of the steel according to the present invention which is excellent in thermal stability, the softening due to grain growth will not occur, so that the initial route of current flow is prevented from broadening and a sufficient nugget diameter is readily formed. On the other hand, the resistance heating is greatly influenced by the electric resistance of the base metal; when the base metal resistance is high, excessive resistance heating will occur and, when it is in excess of the optimum condition range, expulsion and surface flash will readily occur. Generally, the optimum condition range in spot welding is expressed in terms of the range from the welding current causing formation of a nugget diameter of $4\times\sqrt{t}$ (t being the jointing material sheet thickness) to the expulsion current or in terms of the range from the minimum current for button breakage being manifested to the expulsion current.

(F) Re: Rolling:

The rolling is carried out from a temperature exceeding 1000° C. in the austenite temperature range using a reversing mill or tandem mill unit. From the industrial productivity viewpoint, a tandem mill unit is preferably used in at least several final stages.

A slab obtained by continuous casting or casting and slabbing or a steel sheet obtained by strip casting, for instance, if necessary once subjected to hot or cold working, is used and rolled after reheating to a temperature exceeding 1000° C., if it is a cold one. When the rolling start temperature is not higher than 1000° C., the rolling load becomes excessive and it becomes difficult to attain a sufficient reduction and, in addition, it becomes difficult to finish the rolling at a temperature not lower than the $Ar_3$ point with a sufficient reduction, with the result that the desired mechanical characteristics or thermal stability cannot be obtained. Preferably, the rolling is started from a temperature not lower than 1025° C., more preferably not lower than 1050° C. In order to prevent austenite grains from becoming coarse and to suppress the equipment cost and heating fuel cost, the upper limit is set at a level not higher than 1350° C., preferably not higher than 1250° C. In the case of steel species for which there is no need to sufficiently dissolve such a precipitate as TiC or NbC in austenite, it is preferable to reheat the material to a relatively low temperature (1050 to 1150° C.) within the range mentioned above. This is because initial austenite crystal grains are rendered fine and final ferrite crystal grains also become capable of being readily rendered fine.

The rolling finish temperature is selected within the range of not lower than the $Ar_3$ point and not lower than 780° C. so that austenite may be transformed into ferrite after rolling. When the finish temperature is lower than the $Ar_3$ point, ferrite is formed during rolling. When the finish temperature is lower than 780° C., the rolling load increases and it becomes difficult to apply a sufficient reduction and, in addition, ferrite transformation may occur in the sheet surface layer during rolling. Preferably, the rolling is finished at a temperature not lower than the $Ar_3$ point and not lower than 800° C.

The rolling finish temperature is preferably as low as possible within the range not lower than the $Ar_3$ point and not lower than 780° C. This is because the effect of accumulating work strains introduced into austenite by rolling is increased and the reduction in size of crystal grains is promoted thereby. The $Ar_3$ point of the steel species to be used in the practice of the invention is generally in the range of 780 to 900° C.

The total reduction, as expressed in terms of sheet thickness reduction, in order to promote the size reduction of ferrite is not lower than 90%, preferably not lower than 92%, more preferably not lower than 94%. The sheet thickness reduction within the temperature range from the rolling finish temperature to the "rolling finish temperature+100° C." is preferably not lower than 40%. More preferably, the sheet thickness reduction within the temperature range from the rolling finish temperature to the "rolling finish temperature+80° C." is not lower than 60%. The rolling is carried out in a plurality of continuous passes. The reduction per pass is preferably 15 to 60%. A higher reduction per pass is preferred from the viewpoint of accumulating strains imposed on austenite and rendering the crystal grain diameter of ferrite formed by transformation but it requires an increase in rolling load, which in turn requires a large-sized rolling plant and in addition makes it difficult to control the sheet morphology. In accordance with the method according to the present invention, fine ferrite crystal grains can be obtained even in the rolling including a plurality of passes with a reduction per pass of not higher than 40%. Therefore, when it is desired that the sheet morphology control be facilitated, it is preferable to carry out the final two passes at a reduction per pass of not higher than 40%.

(G) Re: Cooling after Rolling:

After finishing the rolling, the sheet is cooled to a temperature not higher than 720° C. within 0.4 second from the moment of finishing the rolling so that work strains introduced into ferrite may not be relieved but may serve as driving forces for the transformation of austenite to ferrite to form a microstructure comprising fine ferrite crystal grains. Preferably, the sheet is cooled to a temperature not higher than 720° C. within 0.2 second from the moment of finishing the rolling. As for the cooling, water cooling is desirably employed, and the rate of cooling is preferably not lower than 400° C./second as expressed in terms of average cooling rate for the period during which forced cooling is carried out, excluding the period of air cooling.

The reason why the time until cooling to a temperature not higher than 720° C. is prescribed here is that when the cooling is discontinued or slowed down at a temperature exceeding 720° C., the strains introduced by working are relieved before fine ferrite grains are formed, or the strains change in their state of occurrence and no more effectively serve as nuclei for ferrite, so that ferrite crystal grains become remarkably coarse.

When the temperature arrives at a level not higher than 720° C., the sheet enters the transformation temperature range in which the ferrite transformation becomes active. The ferrite transformation temperature range in which the above-mentioned ferrite microstructure is obtained ranges from that temperature to 600° C. Therefore, after arrival at 720° C. or below, the cooling is interrupted or the rate of cooling is lowered, and the sheet is maintained in this temperature range for at least 2 seconds, whereby the formation of the above-mentioned thermally stable ferrite crystal grain microstructure can be secured. When the holding time is shorter, the formation of the above-mentioned thermally stable ferrite crystal grain microstructure may possibly be suppressed. More preferably, the sheet is allowed to remain in the temperature range of 620 to 700° C. for at least 3 seconds.

In order to produce a double phase microstructure steel species the main phase of which is a fine ferrite crystal grain microstructure and which contains at least 5% by volume of martensite dispersed therein, the temperature is preferably lowered to 350° C. or below after the above-mentioned cooling and residence. More preferably, the sheet is cooled to a temperature of 250° C. or below at a cooling rate of not lower than 40° C./sec. If the cooling to a temperature of 350° C. or below is carried out at a cooling rate not higher than 20° C./sec, bainite will be formed readily and the martensite formation may possibly be suppressed.

On the other hand, in order to produce a double phase microstructure steel species the main phase of which is a fine ferrite crystal grain microstructure and which contains 3 to 30% by volume of retained austenite dispersed therein, it is preferred that, after the above-mentioned cooling, the sheet be cooled to 350 to 500° C. at a cooling rate of not lower than 20° C./sec and thereafter cooled slowly at a cooling rate of not higher than 60° C./hour. It is more preferable that the rate of cooling to 400 to 500° C. be not lower than 50° C./sec.

(H) Re: Cooling Equipment:

In carrying out the present invention, the equipment for carrying out the cooling mentioned above is not restricted. Industrially, the use of a water-spraying apparatus with a high water volume density is appropriate. For example, cooling can be effected by disposing water spray headers between the rolled sheet conveying rollers and spraying high pressure water from above and below the sheet at a sufficient water volume density.

(I) Re: Cold Rolling and Annealing:

In order to efficiently produce a thin steel sheet having a fine-grained microstructure, the sheet after hot rolling is pickled, then further cold-rolled and, thereafter, annealed. The reduction in cold rolling is not lower than 40% in order to promote the recrystallization of ferrite during annealing but not higher than 90% considering the fact that the rolling becomes difficult to perform. The rolling equipment is not restricted but a tandem mill or reversing mill unit is preferably used.

In order to attain a fine-grained ferritic microstructure by recrystallization of worked ferrite after cold rolling, the sheet is subjected to heat treatment. The temperature is not lower than the temperature at which ferrite recrystallization occurs and not higher than 900° C. so that crystal grains are suppressed from becoming coarse. Preferably, it is not lower than the $Ac_1$ point and not higher than the $Ac_3$ point. At below the $Ac_1$ point, a long period of time is required for ferrite recrystallization and, at above the $Ac_3$ point, the microstructure becomes an austenite single phase, so that the microstructure tends to become coarse. The annealing time is not shorter than the time required for ferrite recrystallization; the upper limit is not restricted. Ordinary continuous annealing equipment or batchwise annealing equipment, for instance, can be used; for efficient production, however, it is preferable to use continuous annealing equipment and carry out the annealing in a short period of time. When hot-dip plating is carried out using continuous hot-dip plating equipment, the plating equipment generally includes a pre-annealing step, so that it is not necessary to carry out annealing after cold rolling but the cold-rolled material can be directly submitted to the plating equipment.

The following examples illustrate the present invention in further detail.

EXAMPLE 1

Steel species A1 to A11 having the respective chemical compositions shown in Table 1 were prepared by melting and subjected to hot forging to give 30 mm-thick plates. Thereafter, they were reheated to 1050° C. or above and then rolled on a small-sized test tandem mill to give 2 mm-thick sheets.

[Table 1]

TABLE 1

| Steel species | C | Si | Mn | P | S | Al | N | Other components | $Ar_3$ | $2.7 + 5000/(5 + 350 \cdot C + 40 \cdot Mn)^2$ |
|---|---|---|---|---|---|---|---|---|---|---|
| A1 | 0.105 | 0.05 | 1.03 | 0.060 | 0.0035 | 0.030 | 0.0043 | | 824 | 3.43 |
| A2 | 0.075 | 0.03 | 0.44 | 0.021 | 0.0025 | 0.030 | 0.0030 | | 865 | 4.80 |
| A3 | 0.030 | 0.03 | 0.22 | 0.092 | 0.0031 | 0.030 | 0.0027 | | 890 | 11.17 |
| A4 | 0.048 | 0.03 | 0.30 | 0.063 | 0.0023 | 0.015 | 0.0035 | Ca: 0.0021 | 881 | 7.08 |
| A5 | 0.155 | 0.03 | 0.62 | 0.022 | 0.0041 | 0.030 | 0.0024 | Nb: 0.010 | 824 | 3.41 |
| A6 | 0.080 | 0.06 | 0.70 | 0.018 | 0.0056 | 0.034 | 0.0030 | Ni: 0.29, Cr: 0.31 | 836 | 4.04 |
| A7 | 0.061 | 0.54 | 1.53 | 0.015 | 0.0025 | 0.025 | 0.0041 | Mo: 0.21 | 821 | 3.35 |
| A8 | 0.080 | 0.03 | 1.00 | 0.016 | 0.0030 | 0.035 | 0.0035 | Nb: 0.003, Ti: 0.013, Ca: 0.0021 | 836 | 3.64 |
| A9 | 0.050 | 0.01 | 1.80 | 0.018 | 0.0038 | 0.037 | 0.0030 | Ti: 0.022 | 810 | 3.26 |
| A10 | 0.045 | 0.42 | 0.70 | 0.025 | 0.0042 | 0.043 | 0.0030 | V: 0.1 | 882 | 4.80 |
| A11 | 0.023 | 0.02 | 0.18 | 0.011 | 0.0032 | 0.032 | 0.0028 | | 893 | 14.89 |

The rolling finish temperatures and cooling conditions were as shown in Table 2. In each rolling process, the rolling finish temperature was higher than the $Ar_3$ point of the corresponding steel species and multi-pass rolling was carried out in at least 3 passes within the temperature range of the finish temperature to the [finish temperature+100° C.]. In the final two passes, low-reduction rolling was conducted at a reduction per pass of 35%, except for Test No. 3. In the final two passes in Test No. 3, high-reduction rolling was carried out at 50 to 60%. After rolling finished, water cooling was conducted to a predetermined temperature within the temperature range of 500 to 720° C., as shown in Table 2. In some Test Numbers, the water cooling was followed by air cooling and thus a holding time was provided in order to maintain the sheet in the range of 720 to 600° C. In Table 2, there are shown the holding time in the temperature range of 700 to 620° C. in addition to the holding time in the temperature range of 720 to 600° C. Thereafter, water cooling to room temperature was carried out at a rate of about 100° C./sec or, after water cooling to a predetermined temperature within the temperature range of 600 to 400° C., cooling was carried out in a furnace, to give steel sheets varying in second phase microstructure.

[Table 2]

TABLE 2

| Test No. | Steel species | Finishing temperature (° C.) | Cooling time (s) from completion of finishing rolling to 720° C. | Cooling rate (° C./s) | Holding time (s) in the temperature range of 720 to 600° C. | Holding time (s) in the temperature range of 700 to 620° C. within the left-mentioned range | Temperature (° C.) at which 100° C./s rate water cooling was stopped at 600° C. or below |
|---|---|---|---|---|---|---|---|
| 1 | A1 | 835 | 0.14 | 795 | 0.8 | 0.6 | 500 |
| 2 | A1 | 839 | 0.15 | 817 | 3.4 | 3.1 | RT |
| 3 | A1 | 765 | 0.05 | 1021 | 4.1 | 3.6 | RT |
| 4 | A1 | 842 | 0.11 | 1093 | 11.1 | 10.0 | 500 |
| 5 | A1 | 861 | 1.52 | 1080 | 3.2 | 3.0 | 500 |
| 6 | A2 | 865 | 0.15 | 976 | 5.1 | 4.7 | RT |
| 7 | A2 | 871 | 0.16 | 949 | 7.5 | 7.0 | RT |
| 8 | A2 | 875 | 0.14 | 1123 | 6.5 | 5.9 | 500 |
| 9 | A2 | 881 | 0.15 | 1096 | 11.4 | 10.4 | 500 |
| 10 | A3 | 892 | 0.13 | 1620 | 3.2 | 2.8 | RT |
| 11 | A3 | 894 | 0.19 | 1400 | 3.8 | 3.4 | RT |
| 12 | A3 | 895 | 0.14 | 1500 | 5.8 | 5.3 | RT |
| 13 | A3 | 901 | 0.17 | 1240 | 10.8 | 9.8 | RT |
| 14 | A4 | 882 | 0.16 | 1019 | 5.3 | 4.8 | RT |
| 15 | A4 | 878 | 0.17 | 939 | 5.7 | 5.2 | RT |
| 16 | A4 | 883 | 0.14 | 1163 | 3.4 | 3.2 | 500 |
| 17 | A5 | 842 | 0.13 | 911 | 3.5 | 3.2 | 500 |
| 18 | A5 | 825 | 0.15 | 708 | 7.8 | 7.1 | 500 |
| 19 | A5 | 850 | 0.16 | 920 | 0.2 | 0.2 | RT |
| 20 | A6 | 845 | 0.16 | 795 | 6.4 | 5.8 | 500 |
| 21 | A7 | 833 | 0.11 | 1064 | 5.3 | 4.9 | RT |
| 22 | A8 | 845 | 0.12 | 1050 | 5.3 | 4.9 | RT |
| 23 | A9 | 820 | 0.10 | 977 | 7.3 | 6.7 | RT |

TABLE 2-continued

| Test No. | Steel species | Finishing temperature (° C.) | Cooling time (s) from completion of finishing rolling to 720° C. | Cooling rate (° C./s) | Holding time (s) in the temperature range of 720 to 600° C. | Holding time (s) in the temperature range of 700 to 620° C. within the left-mentioned range | Temperature (° C.) at which 100° C./s rate water cooling was stopped at 600° C. or below |
|---|---|---|---|---|---|---|---|
| 24 | A10 | 892 | 0.19 | 919 | 4.3 | 4.0 | RT |
| 25 | A11 | 895 | 0.14 | 1650 | 6.9 | 6.2 | RT |

Note:
Each underline indicates that the relevant value is out of scope of the producing conditions of the present invention.
RT: Room temperature The microstructure of each of the thus-obtained hot-rolled steel sheets was observed in cross section in the direction of steel sheet thickness using a scanning electron microscope.

The ferrite crystal grain diameter and the ferrite grain diameter distribution at the depth of ¼ of the sheet thickness from the sheet surface were determined by carrying out crystal orientation analysis by the EBSP (electron back scattering pattern) method. Observing the microstructure at the depth of ¼ of the sheet thickness from the sheet surface as etched with nital or picric acid using a scanning electron microscope determined the volume fraction of each phase. The microstructure of the second phase other than the ferrite phase in the steel sheets produced in this example comprised pearlite, bainite and intragranular spherical cementite or grain boundary cementite.

For each of the steel sheets according to the present invention, the crystal grain diameter at the depth of 100 μm from the steel sheet surface and the crystal grain diameter in the center were measured in the same manner as mentioned above. As a result, in all the steel sheets according to the present invention, the crystal grain diameter at the depth of 100 μm was not greater than 60% of the grain diameter in the center of the sheet thickness, and the grain diameter at the depth of ¼ of the sheet thickness was not greater than 85% of the grain diameter in the center of the sheet thickness.

As for the mechanical properties, tensile characteristics were tested using JIS No. 5 tensile test specimens, and the tensile strength TS (MPa), yield ratio YR and total elongation El (%) were evaluated.

As for the thermal stability, each specimen was immersed in a salt bath at 700° C. for 10, 30 or 60 minutes and then rapidly cooled and the grain diameter was measured by the same method as mentioned above, and the increase rate X (μm/min) in average crystal grain diameter was calculated by dividing the difference between the grain diameter $d_0$ (μm) before annealing and the grain diameter $d_1$ (μm) after annealing by the annealing time (min).

In Table 3, there are shown the microstructure and properties of each of the thus-obtained hot-rolled steel sheets and the tensile test results. Here, in Test No. 1, the holding time in the temperature range of 720 to 600° C. was as short as 0.8 second, so that the ferrite volume fraction was as small as 14.8% and, further, the grain growth rate upon annealing at 700° C. was high; thus, the sheet was inferior in thermal stability. In Test No. 3 in which high reduction rolling at low temperatures was employed, the grain diameter was excessively small, namely 1.13 μm, and the sheet was inferior in thermal stability and strength-elongation balance. In Test No. 5, the cooling time from completion of finishing rolling to 720° C. was 1.52 seconds and, therefore, the average ferrite crystal grain diameter became 4.52 μm, indicating grain coarsening, and the microstructure became a duplex grain microstructure; hence the sheet was inferior in thermal stability. In Test No. 19, the holding time in the temperature range of 720 to 600° C. was very short, namely 0.2 second, so that the microstructure became such that the amount of bainite was in excess of 95% and the ferrite volume fraction was as low as below 5%. Contrary to these comparatives, the steel sheets obtained according to the present invention in which the cooling conditions were within the range specified herein were superior in both thermal stability and mechanical properties.

[Table 3]

TABLE 3

| Test No. | Average ferrite crystal grain diameter D (μm) | Increase rate X (μm/min) in grain diameter at 700° C. | D · X (μm²/min) | D/3 ≤ d ≤ 3D Area percentage (%) | Dislocation density (cm⁻²) in ferrite grains | Second phase volume fraction | | | | Mechanical properties | | | | |
|---|---|---|---|---|---|---|---|---|---|---|---|---|---|---|---|
| | | | | | | Ferrite volume fraction (%) | Perlite (%) | Bainite (%) | Martensite (%) | Granular cementite (%) | TS (MPa) | YR (-) | El (%) | TS × El (MPa · %) | |
| 1 | 2.23 | 0.251 | 0.560 | 85 | 2.0 × 10⁹ | 14.8 | — | 85.2 | — | — | 578 | 0.96 | 26.5 | 15317 | Comparative |
| 2 | 2.38 | 0.010 | 0.024 | 92 | 8.5 × 10⁷ | 88.5 | 1.0 | 8.50 | 2.0 | — | 563 | 0.94 | 30.7 | 17289 | Invention |
| 3 | 1.13 | 0.110 | 0.124 | 75 | 6.5 × 10⁹ | 94.4 | — | 5.0 | — | 0.6 | 654 | 0.98 | 15.3 | 10006 | Comparative |
| 4 | 2.62 | 0.009 | 0.024 | 91 | 9.5 × 10⁷ | 89.4 | 10.4 | — | — | 0.2 | 505 | 0.91 | 33.0 | 16677 | Invention |
| 5 | 4.52 | 0.221 | 0.999 | 65 | 4.6 × 10⁷ | 87.5 | 12.5 | — | — | — | 445 | 0.84 | 34.5 | 15330 | Comparative |
| 6 | 4.63 | 0.004 | 0.019 | 85 | 6.2 × 10⁷ | 90.5 | 1.0 | 7.5 | 1.0 | — | 475 | 0.86 | 32.1 | 15248 | Invention |
| 7 | 4.17 | 0.005 | 0.020 | 91 | 7.6 × 10⁷ | 92.2 | 4.2 | 2.6 | 1.0 | — | 485 | 0.86 | 32.5 | 15763 | |
| 8 | 5.06 | 0.004 | 0.019 | 85 | 8.2 × 10⁷ | 92.7 | 3.2 | 4.0 | — | 0.1 | 414 | 0.83 | 37.0 | 15301 | |
| 9 | 4.76 | 0.004 | 0.019 | 86 | 4.1 × 10⁷ | 93.4 | 4.2 | 2.3 | — | 0.1 | 407 | 0.83 | 39.8 | 16207 | |
| 10 | 4.25 | 0.005 | 0.021 | 93.5 | 4.0 × 10⁷ | 95.6 | 1.0 | 3.4 | — | — | 434 | 0.90 | 25.8 | 15057 | |

TABLE 3-continued

| | Average ferrite crystal grain | Increase rate X | D/3 ≤ d ≤ 3D | Dislocation density | Second phase volume fraction | | | | | Mechanical properties | | | | |
|---|---|---|---|---|---|---|---|---|---|---|---|---|---|---|
| Test No. | diameter D (μm) | in grain diameter at 700° C. (μm/min) | D · X (μm²/min) | Area percentage (%) | in ferrite grains (cm$^{-2}$) | Ferrite volume fraction (%) | Perlite (%) | Bainite (%) | Martensite (%) | Granular cementite (%) | TS (MPa) | YR (-) | El (%) | TS × El (MPa · %) | |
| 11 | 5.32 | 0.006 | 0.032 | 96 | 5.8 × 10$^7$ | 97.0 | 1.5 | 1.5 | — | — | 422 | 0.92 | 36.5 | 15400 | |
| 12 | 4.50 | 0.005 | 0.023 | 96.5 | 5.6 × 10$^7$ | 96.7 | 2.1 | 1.2 | — | — | 410 | 0.92 | 37.2 | 15250 | |
| 13 | 4.93 | 0.006 | 0.030 | 98 | 4.1 × 10$^7$ | 96.4 | 2.2 | 0.9 | 0.5 | — | 395 | 0.91 | 41.3 | 16313 | |
| 14 | 5.06 | 0.004 | 0.019 | 97 | 3.6 × 10$^7$ | 94.5 | 2.0 | 3.0 | 0.5 | — | 429 | 0.89 | 35.1 | 15049 | |
| 15 | 4.76 | 0.004 | 0.019 | 95 | 6.6 × 10$^7$ | 94.3 | 1.5 | 3.2 | 1.0 | — | 433 | 0.91 | 36.2 | 15680 | |
| 16 | 5.25 | 0.003 | 0.018 | 95 | 3.1 × 10$^7$ | 95.0 | 3.2 | 1.7 | — | 0.1 | 375 | 0.85 | 40.3 | 15092 | |
| 17 | 2.95 | 0.008 | 0.023 | 96 | 7.8 × 10$^7$ | 80.6 | 17.2 | 2.0 | — | 0.2 | 600 | 0.88 | 25.6 | 15360 | |
| 18 | 2.54 | 0.009 | 0.024 | 95 | 5.6 × 10$^7$ | 78.5 | 20.3 | 1.0 | — | 0.2 | 693 | 0.79 | 25.8 | 17879 | |
| 19 | | *1 | | | | ≤5 | — | >95 | — | 0.2 | 960 | 0.9 | 6.4 | 6143 | Comparative |
| 20 | 2.52 | 0.009 | 0.024 | 96 | 9.6 × 10$^7$ | 91.0 | 6.9 | 2.0 | — | 0.1 | 488 | 0.92 | 32.1 | 15671 | Invention |
| 21 | 1.65 | 0.017 | 0.028 | 88 | 7.9 × 10$^7$ | 92.6 | 2.0 | 5.4 | — | — | 588 | 0.97 | 26.1 | 15338 | |
| 22 | 2.75 | 0.008 | 0.023 | 98 | 5.2 × 10$^7$ | 91.7 | — | 6.3 | 2.0 | — | 535 | 0.90 | 32.3 | 17293 | |
| 23 | 2.13 | 0.012 | 0.025 | 96 | 6.6 × 10$^7$ | 93.3 | — | 2.2 | 4.5 | — | 593 | 0.96 | 29.6 | 17544 | |
| 24 | 3.62 | 0.006 | 0.021 | 95 | 4.9 × 10$^7$ | 94.8 | — | 5.2 | — | — | 549 | 0.88 | 29.5 | 16194 | |
| 25 | 6.50 | 0.012 | 0.078 | 86 | 3.1 × 10$^7$ | 98.0 | — | 2.0 | — | — | 423 | 0.76 | 37.6 | 15905 | |

*1: The ferrite volume fraction was too small to be determined.

EXAMPLE 2

Semi-finished products (size: 80 mm in width×100 mm in length×35 mm in thickness) respectively made of steel species 1 to 5 having the respective chemical compositions shown in Table 4 were hot-rolled at a temperature not lower than the Ar$_3$ point under the conditions shown in Table 5, followed by water cooling, to give hot-rolled steel sheets with a sheet thickness of 1.2 mm.

[Table 4]

The hot-rolled steel sheets obtained were measured for average ferrite crystal grain diameter and ferrite grain diameter distribution and for dislocation density and evaluated for thermal stability. Thus, the ferrite crystal grain diameter, ferrite grain diameter distribution and dislocation density were measured, and the thermal stability evaluation was performed in the same manner as mentioned above. The dislocation density ρ (cm$^{-2}$) was determined by measuring the number N of points of intersection and contact between an arbitrary line segment having a length L (cm) and dislocation lines in the

TABLE 4

| Steel species | C | Si | Mn | P | S | Al | N | Ar$_3$ | 2.7 + 5000/(5 + 350 · C + 40 · Mn)$^2$ |
|---|---|---|---|---|---|---|---|---|---|
| 1 | 0.15 | 0.01 | 0.75 | 0.010 | 0.002 | 0.035 | 0.003 | 827 | 3.35 |
| 2 | 0.10 | 0.02 | 1.02 | 0.011 | 0.002 | 0.035 | 0.004 | 834 | 3.47 |
| 3 | 0.19 | 0.03 | 0.99 | 0.012 | 0.001 | 0.030 | 0.002 | 803 | 3.11 |
| 4 | 0.07 | 0.05 | 0.75 | 0.012 | 0.003 | 0.034 | 0.003 | 855 | 4.11 |
| 5 | 0.10 | 0.02 | 1.40 | 0.009 | 0.002 | 0.031 | 0.004 | 819 | 3.24 |

[Table 5]

TABLE 5

| Test No. | Steel species | Finishing temperature (° C.) | Cooling time (s) from completion of finishing rolling to 720° C. | Cooling rate (° C./s) | Holding time (s) in the temperature range of 720 to 600° C. | Holding time (s) in the temperature range of 700 to 620° C. within the left-mentioned range | Time (s) to cooling to 250° C. after holding | |
|---|---|---|---|---|---|---|---|---|
| A | 1 | 830 | 0.17 | 987 | 3.3 | 1.9 | 8.8 | Invention |
| B | | | | | | | | |
| C | | 756 | 0.17 | 945 | 1.6 | 0.56 | 12.3 | Comparative |
| D | 2 | 843 | 0.20 | 1201 | 3.0 | 1.6 | 11.5 | Invention |
| E | 3 | 814 | 0.17 | 1111 | 3.4 | 2.3 | 9.1 | |
| F | | 771 | 0.17 | 826 | 1.5 | 0.67 | 13.3 | Comparative |
| G | 4 | 861 | 0.20 | 1023 | 4.0 | 2.7 | 10.9 | Invention |
| H | 5 | 825 | 0.20 | 1132 | 3.1 | 1.8 | 12.6 | | bright field image under a transmission electron microscope and making a calculation according to the formula (10) given below:

$$\rho = 2N/Lt \qquad \text{formula (10)}$$

wherein t is the sheet thickness (cm).

As for the thermal stability of ferrite crystal grains, each specimen was immersed in a salt bath at 700° C. for 10, 30 or 60 minutes and then rapidly cooled and the grain diameter was measured by the same method as mentioned above, and the increase rate X (μm/min) in average crystal grain diameter was calculated by dividing the difference between the grain diameter $d_0$ (μm) before annealing and the grain diameter $d_1$ (μm) after annealing by the annealing time (min).

For each of the steel sheets according to the present invention, the crystal grain diameter at the depth of 100 μm from the steel sheet surface and the crystal grain diameter in the center were measured in the same manner as mentioned above. As a result, in all the steel sheets according to the present invention, the crystal grain diameter at the depth of 100 μm was not greater than 60% of the grain diameter in the center of the sheet thickness, and the grain diameter at the depth of ¼ of the sheet thickness was not greater than 85% of the grain diameter in the center of the sheet thickness.

The thus-obtained hot-rolled steel sheets were subjected to reheating treatment within the range of 730 to 830° C. to reveal the influences exerted by the reheating treatment on the mechanical properties of the steel sheets, and the average ferrite crystal grain diameter measurements were again carried out. As for the mechanical properties, the tensile characteristics were tested using JIS No. 5 tensile test specimens, and the tensile strength TS (MPa), yield ratio YR and total elongation El (%) were evaluated.

In Table 6, there are shown, for each hot-rolled steel sheet obtained in the above manner, the microstructure, the properties and the tensile test results of as well as the results of the second average ferrite crystal grain diameter measurement after the reheating treatment within the range of 730 to 830° C. Here, in Test Nos. C and F, the steel sheets after hot rolling were inferior in mechanical characteristics and in thermal stability as well and, after the reheating treatment, the ferrite crystal grain diameters were in excess of 8 μm and further deteriorations in mechanical characteristics could be confirmed. In contrast to these comparatives, the steel sheets excellent in thermal stability in the examples of the practice of the present invention showed excellent mechanical characteristics and showed almost no changes in grain diameter even after tens of seconds of reheating treatment at 730 to 830° C. Thus, it could be confirmed that the steel sheets according to the present invention were found fine grain-strengthened even after the reheating treatment.

[Table 6]

TABLE 6

| Test No. | Steel species | Average ferrite crystal grain diameter D (μm) | Increase rate X (μm/min) in grain diameter at 700° C. | D · X (μm²/min) | Dislocation density (cm⁻²) in ferrite grains | D/3 ≦ d ≦ 3D Area percentage (%) | Ferrite volume fraction (%) | Second phase volume fraction | | | |
|---|---|---|---|---|---|---|---|---|---|---|---|
| | | | | | | | | Perlite (%) | Bainite (%) | Martensite (%) | Granular cementite (%) |
| A | 1 | 1.9 | 0.015 | 0.029 | 9.5 × 10⁷ | 93 | 92.3 | 6.5 | — | — | 1.2 |
| B | | | | | | | | | | | |
| C | | 1.5 | 0.12 | 0.18 | 1.1 × 10¹⁰ | 72 | 90.7 | 2.4 | 6.9 | — | — |
| D | 2 | 2.0 | 0.021 | 0.042 | 9.1 × 10⁷ | 96 | 95.7 | 1.7 | — | — | 2.6 |
| E | 3 | 1.6 | 0.012 | 0.019 | 1.2 × 10⁸ | 95 | 90.5 | 8.9 | — | — | 0.6 |
| F | | 1.3 | 0.13 | 0.17 | 4.5 × 10¹⁰ | 68 | 92.4 | — | — | — | 7.6 |
| G | 4 | 2.3 | 0.024 | 0.055 | 6.3 × 10⁷ | 92 | 97.3 | — | — | — | 2.7 |
| H | 5 | 1.8 | 0.016 | 0.029 | 8.8 × 10⁷ | 95 | 95.1 | — | 2.4 | — | 2.5 |

| | Mechanical properties | | | | Reheating and influences thereof | | | |
|---|---|---|---|---|---|---|---|---|
| Test No. | TS (MPa) | YR (-) | El (%) | TS × El (MPa · %) | Reheating temperature (° C.) | Holding time (s) | Average ferrite crystal grain diameter D (μm) | |
| A | 575 | 0.97 | 26.5 | 15238 | 780 | 30 | 1.9 | Invention |
| B | | | | | 830 | 10 | 2.0 | |
| C | 599 | 0.99 | 13.7 | 8206 | 830 | 10 | 8.2 | Comparative |
| D | 545 | 0.96 | 28.1 | 15315 | 750 | 60 | 2.1 | Invention |
| E | 693 | 0.95 | 23.4 | 16216 | 830 | 10 | 1.6 | |
| F | 705 | 0.99 | 11.0 | 7755 | 780 | 60 | 11.6 | Comparative |
| G | 575 | 0.96 | 27.5 | 15813 | 750 | 30 | 2.3 | Invention |
| H | 556 | 0.96 | 28.3 | 15735 | 750 | 30 | 1.8 | |

EXAMPLE 3

Steel species AA to AZ having the respective chemical compositions shown in Table 7 were prepared by melting, followed by hot forging to reduce the thickness to 30 mm. Thereafter, each semi-finished product was reheating ed to a temperature of 1100 to 1200° C. and then rolled in 5 passes at a temperature higher than the $Ar_3$ point to give a 2 mm-thick finished sheet. In the last two passes, light reduction rolling was carried out at a reduction not higher than 35%/pass. After rolling, each sheet was cooled under the conditions shown in Table 8. The microstructure of each steel material obtained was observed in a cross section of the steel sheet thickness using a scanning electron microscope (SEM).

[Table 7]

TABLE 7

| Steel species | C | Si | Mn | P | S | Al | Cr | Mo | Nb | Ti | $2.7 + 5000/(5 + 350 \cdot C + 40 \cdot Mn)^2$ | $Ar_3$ (° C.) |
|---|---|---|---|---|---|---|---|---|---|---|---|---|
| AA | 0.05 | 0.03 | 2.49 | 0.011 | 0.003 | 0.034 | — | — | — | — | 3.04 | 775 |
| AB | 0.09 | 1.08 | 1.80 | 0.018 | 0.001 | 0.030 | — | — | 0.010 | — | 3.13 | 820 |
| AC | 0.06 | 0.80 | 1.58 | 0.015 | 0.002 | 0.032 | 0.48 | — | — | — | 3.33 | 830 |
| AD | 0.06 | 0.49 | 1.98 | 0.012 | 0.003 | 0.030 | 0.26 | — | 0.009 | — | 3.15 | 800 |
| AE | 0.07 | 0.51 | 1.56 | 0.014 | 0.001 | 0.033 | 0.62 | — | — | 0.013 | 3.29 | 815 |
| AF | 0.08 | 0.58 | 2.10 | 0.013 | 0.003 | 0.031 | — | — | — | — | 3.07 | 800 |
| AG | 0.05 | 0.53 | 1.56 | 0.016 | 0.002 | 0.036 | — | 0.24 | — | — | 3.39 | 835 |
| AY | 0.28 | 0.04 | 2.45 | 0.014 | 0.002 | 0.034 | — | — | — | — | 2.82 | 730 |
| AZ | 0.06 | 0.03 | 3.36 | 0.012 | 0.003 | 0.037 | — | — | — | — | 2.89 | 740 |

[Table 8]

TABLE 8

| Test No. | Steel species | Finishing temperature (° C.) | Cooling time (s) from completion of finishing rolling to 720° C. | Cooling rate (° C./s) | Holding time (s) in the temperature range of 720 to 600° C. | Holding time (s) in the temperature range of 700 to 620° C. within the left-mentioned range | Time (s) to cooling to 250° C. after holding |
|---|---|---|---|---|---|---|---|
| A1 | AA | 800 | 0.065 | 1231 | 4.3 | 4.1 | 73 |
| A2 | AB | 845 | 0.10 | 1250 | 6.6 | 6.4 | 78 |
| A3 | AC | 850 | 0.11 | 1182 | 6.5 | 6.2 | 81 |
| A4 | AD | 820 | 0.085 | 1176 | 4.2 | 3.9 | 72 |
| A5 | AE | 835 | 0.094 | 1223 | 6.0 | 5.8 | 78 |
| A6 | AF | 820 | 0.085 | 1176 | 2.7 | 2.5 | 74 |
| A7 | AG | 860 | 0.12 | 1167 | 7.4 | 7.1 | 68 |
| A8 | AY | 800 | 0.067 | 1194 | 8.0 | 7.8 | 56 |
| A9 | AZ | 800 | 0.072 | 1111 | 9.8 | 9.6 | 57 |
| A10 | AA | 800 | <u>0.58</u> | <u>138</u> | 3.8 | 3.5 | 76 |
| A11 | AD | 800 | 0.17 | 471 | <u>1.8</u> | 1.6 | 78 |

Note:
Each underline indicates that the relevant value is out of scope of the producing conditions of the present invention.

The ferrite crystal grain diameter and grain diameter distribution were determined by carrying out crystal orientation analysis at the depth of ¼ of the sheet thickness from the sheet surface using the EBSP (electron back scattering pattern) method. Observing the microstructure at the depth of ¼ of the sheet thickness from the sheet surface as etched with nital or picric acid using a SEM determined the volume fraction of each phase. The ferrite volume fraction and martensite volume fraction were measured at the depth of ¼ of the sheet thickness from the sheet surface by the so-called mesh method and were expressed in terms of arithmetic means. Further, JIS No. 5 test specimens were taken from each rolled material and the mechanical characteristics were evaluated on a tensile tester at ordinary temperature.

For each of the steel sheets according to the present invention, the crystal grain diameter at the depth of 100 μm from the steel sheet surface and the crystal grain diameter in the center were measured in the same manner as mentioned above. As a result, in all the steel sheets according to the present invention, the crystal grain diameter at the depth of 100 μm was not greater than 60% of the grain diameter in the center of the sheet thickness, and the grain diameter at the depth of ¼ of the sheet thickness was not greater than 85% of the grain diameter in the center of the sheet thickness.

As for the thermal stability, each specimen was immersed in a salt bath at 700° C. for 10, 30 or 60 minutes and then rapidly cooled, and the increase rate X (μm/min) in average crystal grain diameter was calculated by the same method as described above.

These results are shown in Table 9. Here, in Test No. A10, the ferrite crystal grain diameter was as coarse as 4.57 μm, so that the sheet was inferior in mechanical characteristics and in thermal stability. In each of Test Nos. A8, A9 and A11, the product D·X of the increase rate X in average crystal grain diameter and the average crystal grain diameter D was in excess of 0.1 μm²/min and the ferrite volume fraction was small, so that the sheet was inferior in mechanical characteristics and in thermal stability. In contrast with these comparatives, the steel sheets obtained in Test Nos. A1 to A7 in accordance with the present invention each had a fine martensite crystal grain diameter around 2.5 μm in spite of light reduction rolling and comprised 50% by volume or more of ferrite and 10% by volume or more of martensite. Such ferrite microstructures are thermally stable and contain an appropriate amount of martensite and therefore can show high strength and good elongation characteristics.

[Table 9]

TABLE 9

| Test No. | Microstructure | Average ferrite crystal grain diameter D (μm) | Increase rate X (μm/min) in grain diameter at 700° C. | D·X (μm²/min) | D/3 ≦ d ≦ 3D Area percentage (%) | Dislocation density ($cm^{-2}$) in ferrite grains |
|---|---|---|---|---|---|---|
| A1  | α + M     | 2.64 | 0.010 | 0.026 | 89 | $7.2 \times 10^7$ |
| A2  | α + M     | 2.51 | 0.009 | 0.023 | 88 | $5.4 \times 10^7$ |
| A3  | α + M     | 2.76 | 0.010 | 0.028 | 93 | $5.7 \times 10^7$ |
| A4  | α + M     | 2.83 | 0.008 | 0.022 | 90 | $6.1 \times 10^7$ |
| A5  | α + M     | 2.48 | 0.009 | 0.022 | 88 | $5.6 \times 10^7$ |
| A6  | α + M     | 2.62 | 0.010 | 0.025 | 91 | $6.9 \times 10^7$ |
| A7  | α + M     | 2.75 | 0.011 | 0.029 | 90 | $5.3 \times 10^7$ |
| A8  | α + M + B | 2.47 | 0.048 | 0.118 | 82 | $8.6 \times 10^7$ |
| A9  | α + M + B | 2.39 | 0.054 | 0.128 | 73 | $1.9 \times 10^9$ |
| A10 | α + M + B | 4.57 | 0.010 | 0.046 | 87 | $8.8 \times 10^7$ |
| A11 | α + M     | 2.98 | 0.037 | 0.109 | 82 | $2.1 \times 10^9$ |

| | | | Mechanical properties | | | | |
|---|---|---|---|---|---|---|---|
| Test No. | Ferrite (%) | Martensite (%) | TS (MPa) | YR (-) | El (%) | TS × El (MPa · %) | |
| A1  | 65.7 | 34.3 | 813  | 0.62 | 20.5 | 16667 | Invention |
| A2  | 78.2 | 21.8 | 938  | 0.61 | 20.6 | 19323 | |
| A3  | 88.6 | 11.4 | 789  | 0.63 | 24.1 | 19015 | |
| A4  | 75.8 | 24.2 | 788  | 0.58 | 24.5 | 19306 | |
| A5  | 78.9 | 21.1 | 748  | 0.55 | 25.9 | 19373 | |
| A6  | 74.8 | 25.2 | 804  | 0.65 | 23.8 | 19135 | |
| A7  | 77.9 | 22.1 | 791  | 0.59 | 24.8 | 19617 | |
| A8  | 37.8 | 37.1 | 1027 | 0.81 | 10.2 | 10475 | Comparative |
| A9  | 28.8 | 40.7 | 965  | 0.84 | 8.9  | 8589  | |
| A10 | 41.2 | 29.5 | 786  | 0.82 | 10.5 | 8253  | |
| A11 | 46.2 | 53.8 | 615  | 0.78 | 22.7 | 13961 | |

Note:
The symbols in the column of microstructure indicate the following meaning:

α: ferrite,

M: Martensite,

B: Bainite.

EXAMPLE 4

Steel species A1 to A10 having the respective chemical compositions shown in Table 10 were prepared by melting, followed by hot forging to reduce the thickness to 35 mm. Thereafter, each semi-finished product was reheated to a temperature of 1050 to 1250° C. and then rolled in 5 passes at a temperature higher than the $Ar_3$ point to give a 1.5 mm-thick finished sheet. After rolling, each sheet was cooled under the conditions shown in Table 11. The microstructure of each steel material obtained was observed in a cross section of the steel sheet thickness using a scanning electron microscope (SEM) method.

[Table 10]

TABLE 10

| Steel species | C | Si | Mn | Al | P | S | Nb | Ti | Nb + Ti | $2.7 + 5000/(5 + 350 \cdot C + 40 \cdot Mn)^2$ | $Ar_3$ (° C.) |
|---|---|---|---|---|---|---|---|---|---|---|---|
| A1 | 0.19 | 0.46 | 2.45 | 0.84 | 0.008 | 0.002 | — | — | — | 2.87 | 825 |
| A2 | 0.14 | 0.46 | 1.98 | 0.83 | 0.012 | 0.001 | — | — | — | 2.98 | 868 |
| A3 | 0.20 | 0.49 | 2.02 | 0.87 | 0.010 | 0.003 | 0.008 | — | 0.008 | 2.91 | 844 |
| A4 | 0.09 | 0.57 | 1.98 | 0.76 | 0.008 | 0.006 | — | — | — | 3.07 | 893 |
| A5 | 0.11 | 1.75 | 1.22 | 0.36 | 0.025 | 0.008 | 0.013 | 0.015 | 0.028 | 3.29 | 879 |
| A6 | 0.11 | 1.32 | 1.26 | 0.35 | 0.015 | 0.001 | — | 0.019 | 0.019 | 3.27 | 891 |
| A7 | 0.12 | 0.75 | 1.83 | 0.57 | 0.018 | 0.003 | — | — | — | 3.05 | 854 |
| A8 | 0.14 | 1.48 | 1.66 | 0.02 | 0.008 | 0.001 | 0.013 | — | 0.013 | 3.04 | 817 |
| A9 | 0.28 | 0.42 | 2.37 | 0.83 | 0.011 | 0.003 | 0.027 | — | 0.027 | 2.83 | 789 |
| A10 | 0.18 | 1.31 | 1.42 | 0.35 | 0.015 | 0.002 | 0.052 | 0.150 | 0.202 | 3.02 | 866 |

[Table 11]

TABLE 11

| Test No. | Steel species | Finishing temperature (° C.) | Cooling time (s) from completion of finishing rolling to 720° C. | Cooling rate (° C./s) | Holding time (s) in the temperature range of 720 to 600° C. | Holding time (s) in the temperature range of 700 to 620° C. within the left-mentioned range | Cooling rate (° C./s) from 600° C. to 450° C. | Cooling rate (° C./h) below 450° C. |
|---|---|---|---|---|---|---|---|---|
| 1 | A1 | 854 | 0.15 | 900 | 9.3 | 6.8 | 60 | 22 |
| 2 | A2 | 900 | 0.16 | 1125 | 4.7 | 4.4 | 75 | 26 |
| 3 | A3 | 861 | 0.13 | 1090 | 4.7 | 3.1 | 82 | 24 |
| 4 | A4 | 908 | 0.15 | 1253 | 3.8 | 3.5 | 63 | 24 |
| 5 | A5 | 892 | 0.18 | 956 | 3.7 | 3.4 | 80 | 26 |
| 6 | A6 | 913 | 0.18 | 1072 | 2.7 | 2.4 | 85 | 26 |
| 7 | A7 | 866 | 0.13 | 1123 | 4.0 | 3.7 | 71 | 27 |
| 8 | A8 | 847 | 0.11 | 1155 | 3.3 | 3.0 | 55 | 26 |
| 9 | A9 | 853 | 0.12 | 1108 | 5.3 | 2.8 | 59 | 22 |
| 10 | A10 | 872 | 0.12 | 1267 | 3.1 | 2.7 | 54 | 26 |
| 11 | A1 | 868 | 0.13 | 1138 | <u>1.5</u> | 1.3 | 77 | 22 |
| 12 | A4 | 912 | <u>1.25</u> | <u>154</u> | 4.1 | 3.8 | 63 | 24 |
| 13 | A8 | <u>766</u> | 0.07 | 657 | 3.5 | 3.2 | 62 | 23 |

Note:
Each underline indicates that the relevant value is out of scope of the producing conditions of the present invention.

The ferrite crystal grain diameter and grain diameter distribution were determined by carrying out crystal orientation analysis at the depth of ¼ of the sheet thickness from the sheet surface using the EBSP (electron back scattering pattern) method. Observing the microstructure at the depth of ¼ of the sheet thickness from the sheet surface as etched with nital or picric acid using a SEM determined the volume fraction of each phase. The ferrite volume fraction was measured at the depth of ¼ of the sheet thickness from the sheet surface by the so-called mesh method and was expressed in terms of arithmetic mean. The retained austenite volume fraction was determined by X-ray diffraction measurement. Further, JIS No. 5 test specimens were taken from each rolled material and the mechanical characteristics were evaluated on a tensile tester at ordinary temperature. As for the thermal stability, each specimen was immersed in a salt bath at 700° C. for 10, 30 or 60 minutes and then rapidly cooled, and the increase rate X (μm/min) in average crystal grain diameter was calculated by the same method as described above.

For each of the steel sheets according to the present invention, the crystal grain diameter at the depth of 100 μm from the steel sheet surface and the crystal grain diameter in the center of the sheet thickness were measured in the same manner as mentioned above. As a result, in all the steel sheets according to the present invention, the crystal grain diameter at the depth of 100 μm was not greater than 60% of the grain diameter in the center of the sheet thickness, and the grain diameter at the depth of ¼ of the sheet thickness was not greater than 85% of the grain diameter in the center of the sheet thickness.

These results are shown in Table 12. In Test Nos. 1 to 8 and 10, namely in the examples according to the present invention, the ferrite occurred as fine grains and the steel sheets were excellent in thermal stability and mechanical characteristics. On the contrary, in Test Nos. 9 and 11 to 13, namely in the comparatives, the steel sheets were inferior in thermal stability and mechanical characteristics to those obtained in the examples according to the present invention.

[Table 12]

TABLE 12

| Test No. | Microstructure | Average ferrite crystal grain diameter D (μm) | Increase rate X (μm/min) in grain diameter at 700° C. | D · X (μm²/min) | D/3 ≦ d ≦ 3D Area percentage (%) | Dislocation density (cm⁻²) in ferrite grains |
|---|---|---|---|---|---|---|
| 1 | α + B + γ | 1.91 | 0.009 | 0.017 | 92 | $6.6 \times 10^7$ |
| 2 | α + B + γ | 2.08 | 0.010 | 0.021 | 89 | $5.1 \times 10^7$ |
| 3 | α + B + γ | 1.41 | 0.014 | 0.020 | 87 | $8.8 \times 10^7$ |
| 4 | α + B + γ | 2.36 | 0.010 | 0.024 | 94 | $5.8 \times 10^7$ |
| 5 | α + B + γ | 2.26 | 0.007 | 0.016 | 92 | $4.4 \times 10^7$ |
| 6 | α + B + γ | 2.55 | 0.009 | 0.024 | 90 | $4.1 \times 10^7$ |
| 7 | α + B + γ | 2.21 | 0.009 | 0.020 | 91 | $6.3 \times 10^7$ |
| 8 | α + B + γ | 1.88 | 0.010 | 0.019 | 91 | $7.1 \times 10^7$ |
| 9 | α + B + γ + cm | 1.96 | 0.012 | 0.023 | 81 | $8.9 \times 10^7$ |
| 10 | α + B + γ | 2.12 | 0.030 | 0.063 | 71 | $3.2 \times 10^7$ |
| 11 | α + B + γ | 1.83 | 0.057 | <u>0.104</u> | 78 | $1.8 \times 10^7$ |
| 12 | α + B + γ | <u>4.26</u> | 0.027 | <u>0.115</u> | 84 | $7.6 \times 10^7$ |
| 13 | α + B + γ + cm | 2.11 | 0.098 | <u>0.207</u> | 69 | $4.6 \times 10^7$ |

| Test No. | Ferrite volume fraction (%) | Retained austenite volume fraction (%) | Mechanical properties | | | |
|---|---|---|---|---|---|---|
| | | | TS (MPa) | El (%) | TS × El (MPa · %) | |
| 1 | 77.1 | 13.7 | 821 | 31 | 25451 | Invention |
| 2 | 83.9 | 10.8 | 672 | 33 | 22176 | |
| 3 | 76.2 | 14.4 | 861 | 29 | 24969 | |
| 4 | 86.1 | 9.1 | 608 | 34 | 20672 | |
| 5 | 81.9 | 11.5 | 812 | 32 | 25984 | |
| 6 | 82.2 | 8.6 | 722 | 30 | 21660 | |
| 7 | 83.1 | 8.9 | 658 | 32 | 21056 | |
| 8 | 80.9 | 11.3 | 710 | 33 | 23430 | |
| 9 | <u>38.6</u> | 2.1 | 1265 | 10 | 12650 | Comparative |
| 10 | 65.5 | 6.7 | 785 | 22 | 17270 | Invention |
| 11 | <u>41.9</u> | 8.9 | 928 | 17 | 15776 | Comparative |
| 12 | 53 | 6.3 | 711 | 20 | 14220 | |
| 13 | 68 | 2.8 | 788 | 11 | 8668 | |

Note:
The symbols in the column of microstructure indicate the following meaning:
α: ferrite,
B: bainite.
γ: retained austenite,
cm: granular cementite.

EXAMPLE 5

Slabs, 50 mm in thickness, made of steel species A to C having the respective chemical compositions shown in Table 13 were hot-rolled in continuous 6 passes at a total reduction of 96% under the rolling conditions shown in Table 14 and then cooled under the cooling conditions shown in Table 14 to give 2 mm-thick steel sheets.

[Table 13]

TABLE 13

| Steel species | C | Si | Mn | P | S | sol. Al | Cr | $2.7 + 5000/(5 + 350 \cdot C + 40 \cdot Mn)^2$ | Ar₃ (° C.) |
|---|---|---|---|---|---|---|---|---|---|
| A | 0.06 | 0.50 | 2.00 | 0.009 | 0.001 | 0.03 | 0.2 | 3.14 | 790 |
| B | 0.10 | 0.03 | 1.00 | 0.010 | 0.003 | 0.02 | — | 3.48 | 820 |
| C | 0.20 | 0.45 | 2.53 | 0.008 | 0.001 | 0.90 | — | 2.86 | 850 |

TABLE 14

| Hot-rolled sheet species | Chemical composition | Heating temperature (° C.) | Finishing temperature (° C.) | Cooling time (s) from completion of finishing rolling to 720° C. | Cooling rate (° C./s) | Holding time (s) in the temperature range of 720 to 600° C. |
|---|---|---|---|---|---|---|
| Sample 1 | A | 1200 | 830 | 0.18 | 800 | 5 |
| Sample 2 | B | 900 | <u>700</u> | — | — | — |
| Sample 3 | A | 1200 | 830 | <u>1.6</u> | <u>100</u> | 5 |
| Sample 4 | B | 1100 | 820 | 0.14 | 1200 | 3 |
| Sample 5 | B | 1200 | 850 | <u>1.5</u> | <u>180</u> | 6 |
| Sample 6 | C | 1150 | 870 | 0.12 | 1000 | 6 |
| Sample 7 | C | 1000 | <u>750</u> | <u>2.0</u> | <u>Air cooling</u> | 5 |

| Hot-rolled sheet species | Holding time (s) in the temperature range of 700 to 620° C. within the left-mentioned range | Cooling rate (° C./s) below 600° C. | |
|---|---|---|---|
| Sample 1 | 4 | Cooled to room temperature at 100° C./s | Invention |
| Sample 2 | 5 | " | Comparative |
| Sample 3 | 4 | " | |
| Sample 4 | 2 | " | Invention |
| Sample 5 | 5 | Cooled to 500° C./s at 100° C./s and then slowly cooled at 40° C./h | Comparative |
| Sample 6 | 5 | Cooled to 400° C./s at 100° C./s and then slowly cooled at 40° C./h | Invention |
| Sample 7 | 4 | Cooled to 400° C./s at 100° C./s and then slowly cooled at 40° C./h | Comparative |

Note:
Each underline indicates that the relevant value is out of scope of the producing conditions of the present invention.

In the final two passes, the samples 1, 4 and 6 according to the present invention and the samples 3 and 5 in the comparatives were rolled at a light reduction of 40 to 35%, and the samples 2 and 7 in the comparatives were rolled at low temperatures and, in the last pass, it was rolled at a great reduction of 65%. After rolling, each sample was pickled for scale removal. This sample was cut to pieces with a size of 80×200 mm, which were then plated under the conditions described below using a vertical hot-dip Zn plating apparatus.

First, each 2.0 mm-thick steel sheet was washed with an NaOH solution at 75° C. for degreasing and then annealed at 600, 720 or 840° C. for 60 seconds in an atmosphere consisting of atmosphere gas $N_2$+20% $H_2$ and having a dew point of −40° C. After annealing, the steel sheet was cooled to the vicinity of the bath temperature, dipped in one of several plating baths for 3 seconds and then adjusted to a plating metal coverage of 50 g/m² per side by the wiping method. In the case of alloying treatment, the plated sheet was then subjected to 30 seconds of heat treatment at 500° C. using an infrared heating apparatus. The cooling rate was adjusted by varying the gas quantity and mist quantity. The temper rolling after plating was carried out at an arithmetical mean roll roughness Ra of 1 to 5 μm and a load of 200 tons/m.

The ferrite crystal grain diameter and grain diameter distribution at the depth of ¼ of the sheet thickness from the steel sheet surface after hot rolling or after plating were examined by the EBSP method, the volume fraction of each phase in the steel microstructure was examined by observation under a SEM and by X-ray diffraction measurement of the etched microstructure and, further, the dislocation density in ferrite crystal grains was examined under a transmission electron microscope. Further, for each steel sheet after plating, JIS No. 5 tensile test specimens were taken and examined for tensile characteristics.

For each of the steel sheets according to the present invention, the crystal grain diameter at the depth of 100 μm from the steel sheet surface and the crystal grain diameter in the center of the sheet thickness were measured in the same manner as mentioned above. As a result, in all the steel sheets according to the present invention, the crystal grain diameter at the depth of 100 μm was not greater than 60% of the grain diameter in the center of the sheet thickness, and the grain diameter at the depth of ¼ of the sheet thickness was not greater than 85% of the grain diameter in the center of the sheet thickness.

These results are shown in Table 15. Here, in each of Test Nos. 1 to 3, 6 to 8, and 12, the hot-rolled steel sheet having a fine ferrite crystal grain microstructure according to the present invention had a high level of thermal microstructure stability and, therefore, even after hot-dip plating treatment, the ferrite crystal grain diameter showed almost no increase and the fine ferritic microstructure retained an appropriate grain diameter distribution and a low dislocation density. Therefore, after plating as well, the steel sheet was excellent in both mechanical characteristics and thermal stability. On the contrary, in the comparatives, namely in Test Nos. 4, 5, 9 and 11, the thermal stability and mechanical characteristics were inferior as compared with those in the examples according to the present invention.

[Table 15]

TABLE 15

| Test No. | Hot rolled sheet species (Sample No.) | Soaking temperature (° C.) | Plating bath | Plating bath temperature (° C.) | Alloying treatment temperature (° C.) | Average ferrite crystal grain diameter D (μm) After hot rolling | Average ferrite crystal grain diameter D (μm) After plating |
|---|---|---|---|---|---|---|---|
| 1 | 1 | 600 | Zn—0.2% Al | 460 | — | 2.2 | 2.2 |
| 2 | 1 | 720 | Zn—0.2% Al | 460 | — | " | 2.2 |
| 3 | 1 | 840 | Zn—0.2% Al | 460 | — | " | 2.6 |
| 4 | 2 | 840 | Zn—0.2% Al | 460 | — | 3.0 | 4.2 |
| 5 | 3 | 840 | Zn—0.2% Al | 460 | — | 6.2 | 6.5 |
| 6 | 4 | 840 | Zn—5% Al | 420 | — | 2.4 | 2.7 |
| 7 | 4 | 840 | Zn—5% Al—3% Mg | 420 | — | " | 2.6 |
| 8 | 4 | 840 | Zn—55% Al—1.6% Si | 600 | — | " | 2.7 |
| 9 | 5 | 840 | Zn—5% Al—1.6% Si | 600 | — | 5.4 | 6.8 |
| 10 | 6 | 840 | Zn—0.1Al % | 460 | 500 | 1.8 | 2.1 |
| 11 | 7 | 840 | Zn—0.1% Al | 460 | 500 | 2.6 | 4.5 |
| 12 | 6 | 840 | Al—10% Si | 620 | — | 1.8 | 2.1 |

| Test No. | Ferrite volume fraction (%) After hot rolling | Ferrite volume fraction (%) After plating | $D/3 \leq d \leq 3D$ Area percentage (%) After hot rolling | $D/3 \leq d \leq 3D$ Area percentage (%) After plating | Dislocation density (cm−2) in ferrite grains After hot rolling | Dislocation density (cm−2) in ferrite grains After plating | Second phase species and volume fraction (%) After hot rolling | Second phase species and volume fraction (%) After plating |
|---|---|---|---|---|---|---|---|---|
| 1 | 89 | 89 | 97 | 97 | $7.6 \times 10^7$ | $7.2 \times 10^7$ | M(11) | tM(11) |
| 2 | " | 89 | " | 98 | " | $5.6 \times 10^7$ | " | " |
| 3 | " | 85 | " | 98 | " | $4.6 \times 10^7$ | " | M(15) |
| 4 | 92 | 84 | 77 | 65 | $2.3 \times 10^{10}$ | $3.1 \times 10^7$ | M(8) | M(16) |
| 5 | 85 | 84 | 93 | 95 | $5.6 \times 10^7$ | $3.9 \times 10^7$ | M(15) | M(16) |
| 6 | 90 | 86 | 95 | 97 | $8.2 \times 10^7$ | $4.2 \times 10^7$ | B(8), M(1), cm(1) | B(9), P(5) |
| 7 | " | 87 | " | 96 | " | $3.7 \times 10^7$ | " | B(10), P(5) |
| 8 | " | 88 | " | 94 | " | $4.5 \times 10^7$ | " | B(8), P(6) |
| 9 | 92 | 87 | 92 | 90 | $2.9 \times 10^8$ | $7.7 \times 10^7$ | P(8) | B(7), P(6) |
| 10 | 75 | 74 | 93 | 95 | $9.8 \times 10^7$ | $3.5 \times 10^7$ | γ(18), B(7) | γ(20), B(6) |
| 11 | 60 | 75 | 77 | 90 | $4.1 \times 10^{10}$ | $8.6 \times 10^7$ | γ(8), B(32) | γ(15), B(10) |
| 12 | 75 | 74 | 93 | 94 | $7.5 \times 10^7$ | $4.1 \times 10^7$ | γ(18), B(7) | γ(15), B(8) |

| Test No. | D · X (μm²/min) After hot rolling | D · X (μm²/min) After plating | YP (MPa) | TS (MPa) | El (%) | YR (-) | TS × El (MPa · %) | |
|---|---|---|---|---|---|---|---|---|
| 1 | 0.025 | 0.025 | | | | | | Invention |
| 2 | 0.025 | 0.029 | | | | | | |
| 3 | 0.025 | 0.032 | 495 | 820 | 22.1 | 0.60 | 18122 | |
| 4 | 0.102 | 0.110 | 420 | 650 | 24.6 | 0.65 | 15990 | Comparative |
| 5 | 0.062 | 0.053 | 410 | 645 | 25.2 | 0.64 | 16254 | |
| 6 | 0.019 | 0.026 | 525 | 560 | 29.5 | 0.94 | 16520 | Invention |
| 7 | 0.019 | 0.022 | 512 | 565 | 28.3 | 0.91 | 15990 | |
| 8 | 0.019 | 0.021 | 488 | 542 | 31.0 | 0.90 | 16802 | |
| 9 | 0.051 | 0.045 | 333 | 445 | 34.8 | 0.75 | 15486 | Comparative |
| 10 | 0.019 | 0.031 | 688 | 810 | 29.6 | 0.85 | 23976 | Invention |
| 11 | 0.132 | 0.156 | 593 | 760 | 23.2 | 0.78 | 17632 | Comparative |
| 12 | 0.019 | 0.025 | 707 | 852 | 23.0 | 0.83 | 19596 | Invention |

Note:
The symbols in the column of microstructure indicate the following meaning:
M: martensite,
tM: tempered martensite,
B: bainite.
γ: retained austenite,
cm: granular cementite.

EXAMPLE 6

The 2 mm-thick steel sheets obtained in Examples 1, 3 and 5 were subjected to penetration butt welding using the plasma welding method (welding speed: 0.5 m/min, welding current: about 180 A) and the laser welding method (welding speed: 1.0 m/min, concentration spot diameter: 0.6 mm, output: 3000 W). The main composition of each steel sheet and the carbon equivalent Ceq(I) are shown in Table 16.

[Table 16]

TABLE 16

| Test No. | Steel sheet sample | Main chemical composition | | | | | | |
|---|---|---|---|---|---|---|---|---|
| | | C | Si | Mn | Cr | Mo | Ni | V | Ceq(I) (%) |
| 1 | Example 1, Test No. 2 | 0.105 | 0.05 | 1.03 | | | | | 0.279 |
| 2 | | | | | | | | | |
| 3 | Example 1, Test No. 9 | 0.075 | 0.03 | 0.44 | | | | | 0.150 |
| 4 | Example 1, Test No. 20 | 0.080 | 0.06 | 0.70 | 0.31 | | 0.3 | | 0.268 |
| 5 | Example 1, Test No. 24 | 0.045 | 0.42 | 0.70 | | | | 0.1 | 0.186 |
| 6 | Example 3, Test No. A1 | 0.050 | 0.03 | 2.49 | | | | | 0.466 |
| 7 | Example 3, Test No. A4 | 0.060 | 0.49 | 1.98 | 0.26 | | | | 0.462 |
| 8 | Example 3, Test No. A7 | 0.050 | 0.53 | 1.56 | | 0.24 | | | 0.392 |
| 9 | Example 5, Test No. 1 | 0.060 | 0.50 | 2.00 | 0.20 | | | | 0.454 |
| 10 | | | | | | | | | |
| 11 | Example 5, Test No. 6 | 0.100 | 0.03 | 1.00 | | | | | 0.268 |
| 12 | Example 1, Test No. 10 | 0.030 | 0.03 | 0.22 | | | | | 0.068 |
| 13 | Example 1, Test No. 25 | 0.023 | 0.02 | 0.18 | | | | | <u>0.054</u> |
| 14 | Example 5, Test No. 10 | 0.200 | 0.45 | 2.53 | | | | | <u>0.640</u> |
| 15 | Example 5, Sample 2, no plating treatment | 0.060 | 0.50 | 2.00 | 0.20 | | | | 0.454 |

Note:
Each underline in the Ceq(I) column indicates that the relevant value is out of scope of the preferred mode of embodiment of the present invention.

The characteristics of each weld obtained were evaluated by punch stretch forming testing using a ball head with a diameter of 50 mm. The shape of the ball head punch stretch forming test specimen is shown in FIG. 1. The state in which the direction of principal strain is parallel to the direction of the weld line 2 is shown in FIG. 1 (*a*) (Type I) and the state in which the direction of principal strain is perpendicular to the direction of the weld line 2 is shown in FIG. 1 (*b*) (Type II). Ball head punch stretch forming test specimen 1 were excised from each weld and evaluated for stretch height and site of rupture.

The results are shown in Table 17. Here, in Test No. 13, the steel sheet had a low Ceq(I) value and the bead melted and solidified on the occasion of welding was soft as compared with the base metal and underwent rupture in Type II testing. In Test No. 14, the steel sheet had an excessively great Ceq(I) value, so that the bead hardened to an excessive extent and underwent bead rupture in type I testing. In Test No. 15, the steel sheet was a fine-grained microstructure steel sheet produced by low-temperature rolling and, therefore, was inferior in thermal stability and rupture occurred in the HAZ site in type II testing. On the contrary, in Test Nos. 1 to 12, it is seen that the steel sheets still showed high workability in a weld-including region after fusion welding using plasma or laser beams and thus were excellent in post-welding formability.

[Table 17]

TABLE 17

| | Welding conditions | | TYPE I (parallel) | | TYPE II (vertical) | |
|---|---|---|---|---|---|---|
| Test No. | Welding method | Welding rate (m/min) | Stretch height (mm) | Site of rupture | Stretch height (mm) | Site of rupture |
| 1 | Plasma | 0.5 | 17.0 | Base metal | 17.5 | Base metal |
| 2 | Laser | 1.0 | 21.0 | Base metal | 21.5 | Base metal |
| 3 | Plasma | 0.5 | 20.0 | Base metal | 23.0 | Base metal |
| 4 | Plasma | 0.5 | 18.0 | Base metal | 17.5 | Base metal |
| 5 | Plasma | 0.5 | 18.0 | Base metal | 18.0 | Base metal |
| 6 | Plasma | 0.5 | 16.0 | Base metal | 16.5 | Base metal |
| 7 | Plasma | 0.5 | 17.0 | Base metal | 16.5 | Base metal |
| 8 | Plasma | 0.5 | 17.0 | Base metal | 16.5 | Base metal |
| 9 | Plasma | 0.5 | 17.5 | Base metal | 16.5 | Base metal |
| 10 | Laser | 1.0 | 19.5 | Base metal | 18.5 | Base metal |
| 11 | Plasma | 0.5 | 18.0 | Base metal | 18.5 | Base metal |
| 12 | Plasma | 0.5 | 18.5 | Base metal | 18.6 | Base metal |
| 13 | Plasma | 0.5 | 18.5 | Base metal | 16.5 | Bead cracking |
| 14 | Plasma | 0.5 | 10.0 | Bead cracking | 16.0 | Base metal |
| 15 | Plasma | 0.5 | 16.0 | Base metal | 10.5 | HAZ site |

EXAMPLE 7

Those 2 mm-thick fine-grained hot-rolled steel sheets which were obtained in Examples 1, 3, 4 and 5 and had a 440 to 780 MPa class of strength in terms of tensile strength TS as well as commercially available coarse-grained hot-rolled steel sheets almost parallel in tensile strength to those just mentioned above were used and evaluated for resistance weldability. The tensile strength TS, the main chemical composition and the carbon equivalent Ceq(II) of each of those hot-rolled steel sheets are shown, together with other data, in Table 18.

[Table 18]

range from the button breakage of the joint to the occurrence of expulsion were determined for resistance weldability evaluation. The maximum load at rupture for the joint on which the smallest button diameter was obtained among the button breakage-causing conditions was taken as the maximum load at joint rupture.

The results are shown in Table 19. Here, in Test No. 1, the Ceq(II) was insufficient, so that the maximum hardness of the weld was low and the joint strength was also low. In Test Nos. 10 to 12, the Ceq(II) or Rsp value was excessively high, so that, in each case, the current range from button breakage to expulsion was narrow. In Test No. 14, the steel sheet was a fine-grained microstructure steel sheet produced by low-tem-

TABLE 18

| Test No. | Steel sheet sample | TS (MPa) | Main chemical composition | | | | | Ceq(II) (%) | Rsp | Average ferrite crystal grain diameter D (μm) | $2.7 + 5000/(5 + 350 \cdot C + 40 \cdot Mn)^2$ | $D \cdot X$ (μm²/min) |
|---|---|---|---|---|---|---|---|---|---|---|---|---|
| | | | C | Si | Al | Mn | Cr | | | | | |
| 1 | Example 1, Test No. 25 | 423 | 0.023 | 0.02 | 0.032 | 0.18 | — | <u>0.025</u> | 13.9 | 6.50 | 14.89 | 0.078 |
| 2 | Example 1, Test No. 10 | 434 | 0.030 | 0.03 | 0.030 | 0.22 | — | 0.033 | 14.2 | 4.25 | 11.17 | 0.021 |
| 3 | Commercial hot-rolled steel sheet | 440 | 0.130 | 0.05 | 0.020 | 1.05 | — | 0.141 | 18.8 | 7.30 | 3.28 | 0.068 |
| 4 | Example 1, Test No. 2 | 578 | 0.105 | 0.05 | 0.030 | 1.03 | — | 0.116 | 18.8 | 2.38 | 3.43 | 0.024 |
| 5 | Example 1, Test No. 17 | 600 | 0.155 | 0.03 | 0.030 | 0.62 | — | 0.162 | 16.4 | 2.95 | 3.41 | 0.023 |
| 6 | Commercial hot-rolled steel sheet | 590 | 0.060 | 0.60 | 0.034 | 1.60 | 0.21 | 0.085 | 30.5 | 6.50 | 3.32 | 0.069 |
| 7 | Example 3, Test No. A1 | 813 | 0.050 | 0.03 | 0.034 | 2.49 | — | 0.078 | 27.9 | 2.64 | 3.04 | 0.026 |
| 8 | Example 3, Test No. A4 | 788 | 0.060 | 0.49 | 0.030 | 1.98 | 0.26 | 0.087 | 31.0 | 2.83 | 3.15 | 0.022 |
| 9 | Example 5, Test No. 3 | 820 | 0.060 | 0.50 | 0.030 | 2.00 | 0.20 | 0.088 | 31.2 | 2.60 | 3.14 | 0.032 |
| 10 | Example 5, Test No. 10 | 810 | 0.200 | 0.45 | 0.900 | 2.53 | — | <u>0.230</u> | 44.1 | 2.10 | 2.86 | 0.031 |
| 11 | Example 4, Test No. 5 | 812 | 0.110 | 1.75 | 0.360 | 1.22 | — | 0.142 | 48.9 | 2.26 | 3.29 | 0.016 |
| 12 | Example 4, Test No. 10 | 785 | 0.180 | 1.31 | 0.350 | 1.42 | — | <u>0.209</u> | 42.3 | 2.12 | 3.02 | 0.063 |
| 13 | Commercial hot-rolled steel sheet | 785 | 0.098 | 0.74 | 0.025 | 1.80 | 0.10 | 0.125 | 32.8 | 5.20 | 3.10 | 0.086 |
| 14 | Example 4, Test No. 13 | 788 | 0.140 | 1.48 | 0.020 | 1.66 | — | 0.173 | 41.4 | 2.11 | 3.04 | 0.207 |

Note:
Each underline in the Ceq(II) column indicates that the relevant value is out of scope of the preferred mode of embodiment of the present invention.

Test pieces, 30×100 mm in size, were excised and each pair of pieces were placed one on top of the other with a lap margin of 30 mm and a joint was formed under the conditions of a pressure of 3920 N (400 kg f) and 30 cycles of electric current application using dome-shaped electrodes with a diameter of 8 mm while the welding current was varied.

The expulsion-causing current was measured, and the joint was subjected to shear tensile testing to evaluate the same for maximum load at rupture. Further, the cross section of the spot weld was observed macroscopically and the nugget diameter after picric acid etching was measured and thereby the electric current range from the formation of a nugget diameter of $4\sqrt{t}$ to the occurrence of expulsion and the current perature rolling and was inferior in thermal stability and, therefore, in spite of the fact that the bead portion had an appropriate hardness, the HAZ site became softened and, therefore, the joint strength was low. In Test Nos. 3, 6 and 13, the steel sheets used were commercial coarse-grained hot-rolled steel sheets and were inferior in thermal stability and, moreover, the current range from button breakage to expulsion was narrow for all of them. On the contrary, the steel sheets used in Test Nos. 2, 4, 5 and 7 to 9 had excellent mechanical characteristics and at the same time had a broad current range proper for welding and showed good resistance weldability.

[Table 19]

TABLE 19

| Test No | Maximum joint rupture load (kN) | Proper current range (kA) | | Strength level |
|---|---|---|---|---|
| | | Current range from $4\sqrt{T}$ nugget diameter formation to expulsion | Current range from button breakage to expulsion | |
| 1 | 16.0 | 5.1 | 3.6 | 440 MPa class |
| 2 | 20.0 | 4.8 | 3.5 | |
| 3 | 20.0 | 4.5 | 2.8 | |
| 4 | 25.0 | 4.0 | 2.5 | 590 MPa class |
| 5 | 25.5 | 3.0 | 1.5 | |
| 6 | 25.5 | 3.0 | 1.0 | |

TABLE 19-continued

| Test No | Maximum joint rupture load (kN) | Proper current range (kA) | | Strength level |
|---|---|---|---|---|
| | | Current range from 4√T nugget diameter formation to expulsion | Current range from button breakage to expulsion | |
| 7 | 35.5 | 3.8 | 2.2 | 780 MPa class |
| 8 | 35.0 | 3.0 | 1.8 | |
| 9 | 35.0 | 2.8 | 1.8 | |
| 10 | 35.0 | 2.5 | 0.3 | |
| 11 | 35.0 | 2.4 | 0.4 | |
| 12 | 35.0 | 2.7 | 0.4 | |
| 13 | 35.0 | 2.8 | 0.4 | |
| 14 | 26.0 | 2.8 | 0.4 | |

EXAMPLE 8

The steel having the chemical composition A1 as shown in Table 1 in Example 1 was prepared by melting and worked to a thickness of 30 mm by hot forging. Thereafter, the semi-finished product was reheated to 1000° C. and then rolled on a small-sized test tandem mill to give a finished 1.3 mm-thick sheet. The rolling finish temperature was 830° C., which was higher than the $Ar_3$ point. The final three rolling passes, a high reduction of 40 to 50% was employed. After rolling finish, water cooling was started after the lapse of 0.05 second and the sheet was cooled to a temperature of 680° C. at a cooling rate of not lower than 1000° C./sec and thereafter allowed to cool for about 4 seconds and, after arrival of the temperature at 600° C., again cooled with water until it was cooled to room temperature. Thereafter, it was pickled, cold-rolled to a thickness of 0.5 mm at a reduction of 62% and then annealed. The annealing was carried out by dipping in a salt bath at 800° C. for about 2 minutes, followed by water cooling to room temperature.

After hot rolling, the average ferrite crystal grain diameters at the depths of 1/16 and 1/4 of the sheet thickness from the surface and at the center of the sheet thickness were 1.4, 1.7 and 2.3 μm, respectively. The ferrite volume fraction was 93% and the second phase was bainite or martensite. At the depth of 1/4 of the sheet thickness from the surface, 90% or more of ferrite grains had a grain diameter falling within the range from 1/3 of to 3 times the average grain diameter at that depth, and the product D·X of the increase rate in grain diameter at 700° C. and the grain diameter was 0.026 μm²/min (=0.015 μm/min×1.7 μm). FIG. 2 shows the time course of the changing ferrite grain diameter at 700° C. This figure indicates that the grain growth rate was as low as 0.015 μm/min. The ferrite grains had an equiaxed shape.

The changes in grain diameter after cold rolling and annealing depending on the annealing time are shown in FIG. 3. The data at annealing time 0 are the grain diameter data after hot rolling. Although the grain diameters increased as a result of annealing, the changes were small; even after annealing, the grain diameters at the depths of 1/16 and 1/4 of the sheet thickness from the surface and at the center of the sheet thickness were 2.2, 2.4 and 2.9 μm, respectively, and the grains were still fine. No grain coarsening occurred due to the prolongation of the annealing time. A commercial cold-rolled steel sheet having the same composition had a crystal grain diameter of about 7.5 μm, while the grain diameter of the steel sheet according to the present invention was about 1/3 of that of the commercial sheet. An example of the microstructure on the occasion mentioned above (5 minutes of annealing at 800° C.) is shown in FIG. 4. The ferrite volume fraction of the steel sheet according to the present invention after annealing was about 70% and the second phase was a martensite. The product D·X of the increase rate in grain diameter at 700° C. and the grain diameter was about 0.02 μm²/min. At the depth of 1/4 of the sheet thickness from the surface, 90% or more of ferrite grains had a grain diameter falling within the range from 1/3 of to 3 times the average grain diameter at that depth.

EXAMPLE 9

The hot-rolled steel sheet of Example 8 was likewise pickled, then cold-rolled to a sheet thickness of 0.5 mm at a reduction of 62%, and annealed. In the annealing, a heat treatment step in an industrial continuous annealing line was simulated. The rate of temperature increase was 10 to 15° C./sec, the soaking temperature was 750° C. or 800° C., and the post-rolling cooling conditions were equivalent to the continuous Zn alloy plating treatment conditions when the soaking temperature was 750° C. or, when the soaking temperature was 800° C., averaging treatment comprising slow cooling from 400° C. to 320° C. was added.

The ferrite grain diameters after cold rolling and heat treatment were 3.5, 3.8 and 4.1 μm at the depths of 1/16 and 1/4 of the sheet thickness from the surface and at the center of the sheet thickness, respectively, when the soaking temperature was 750° C. and, when the soaking temperature was 800° C., they were 4.2, 4.6 and 5.0 μm, respectively. These grain diameters are 50 to 60% of the crystal grain diameter of a commercial cold-rolled steel sheet having the same composition, namely about 7.5 μm. An example of the microstructure of the material obtained by using the soaking temperature of 750° C. is shown in FIG. 5. The product D·X of the increase rate in grain diameter at 700° C. and the grain diameter was not greater than 0.01 μm²/min, and the grain diameter scarcely changed during the measurement period (30 minutes). At the depth of 1/4 of the sheet thickness from the surface, 90% or more of ferrite grains had a grain diameter falling within the range from 1/3 of to 3 times the average grain diameter at that depth. In each steel sheet, the ferrite volume fraction was not lower than 93%, and the second phase was pearlite. The mechanical characteristics of these steel sheets are shown in Table 20. The data indicate that the yield strengths of the steel sheets of the invention were higher by 60 to 80 MPa and the tensile strengths were also higher by 30 to 50 MPa than those of the commercial steel sheet identical in composition. They were almost parallel in uniform elongation (UEL) to the commercial steel sheet in spite of the increases in strength. The total elongation EL values were lower but this is because the commercial steel sheet was as thick as 1.2 mm. Considering the difference in sheet thickness, the steel sheets of the invention are parallel or superior in strength-elongation balance to the commercial steel sheet.

[Table 20]

TABLE 20

| Material | YS (MPa) | TS (MPa) | UEL (%) | EL (%) | YR |
|---|---|---|---|---|---|
| Invention 800° C. | 422.9 | 493.3 | 20.6 | 31.0 | 0.86 |
| Invention 750° C. | 412.2 | 472.4 | 22.7 | 33.4 | 0.87 |
| Commercial steel | 345 | 440 | 23 | 40.5 | 0.78 |

It is seen that the yield strengths of the steel sheets of the invention were higher by 60 to 80 MPa and the tensile strengths were also higher by 30 to 50 MPa than those of the commercial steel sheet identical in composition. They were almost parallel in uniform elongation (UEL) to the commercial steel sheet in spite of the increases in strength. The total elongation EL values were lower but this is because the commercial steel sheet was as thick as 1.2 mm. Considering the difference in sheet thickness, the steel sheets of the invention are parallel or superior in strength-elongation balance to the commercial steel sheet.

INDUSTRIAL APPLICABILITY

The steel sheet according to the present invention has ultra fine crystal grains and is excellent in thermal stability, hence can endure the heat during welding or plating, and also is excellent in mechanical characteristics. Such steel sheet excellent in thermal stability and mechanical characteristics can be produced with ease by the method according to the present invention.

BRIEF DESCRIPTION OF THE DRAWINGS

FIG. 1 (a) shows the state in which the direction of principal strain is parallel to the direction of the weld line, and FIG. 1 (b) shows the state in which the direction of principal strain is perpendicular to the direction of the weld line.

EXPLANATION OF SYMBOLS

Figure 1:
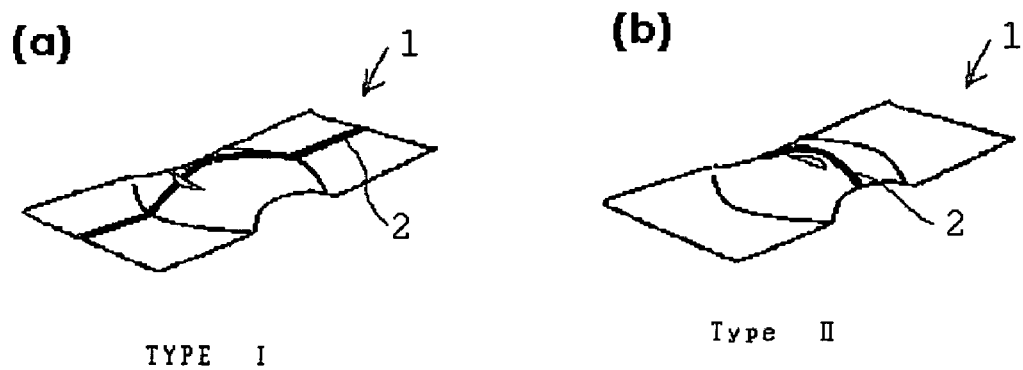
FIG. 1 This figure shows the shape of a ball head punch stretch forming test specimen.
Figure 2:
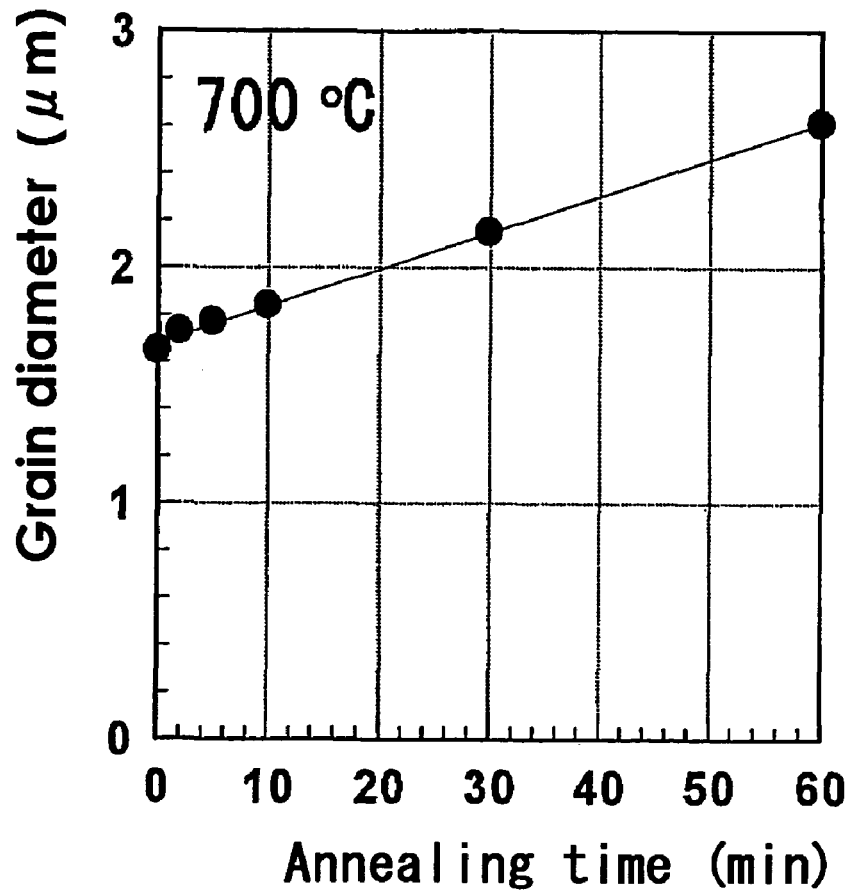
FIG. 2 This figure shows the time course of the changing ferrite grain diameter at the depth of ¼ of the sheet thickness from the surface.
Figure 3:
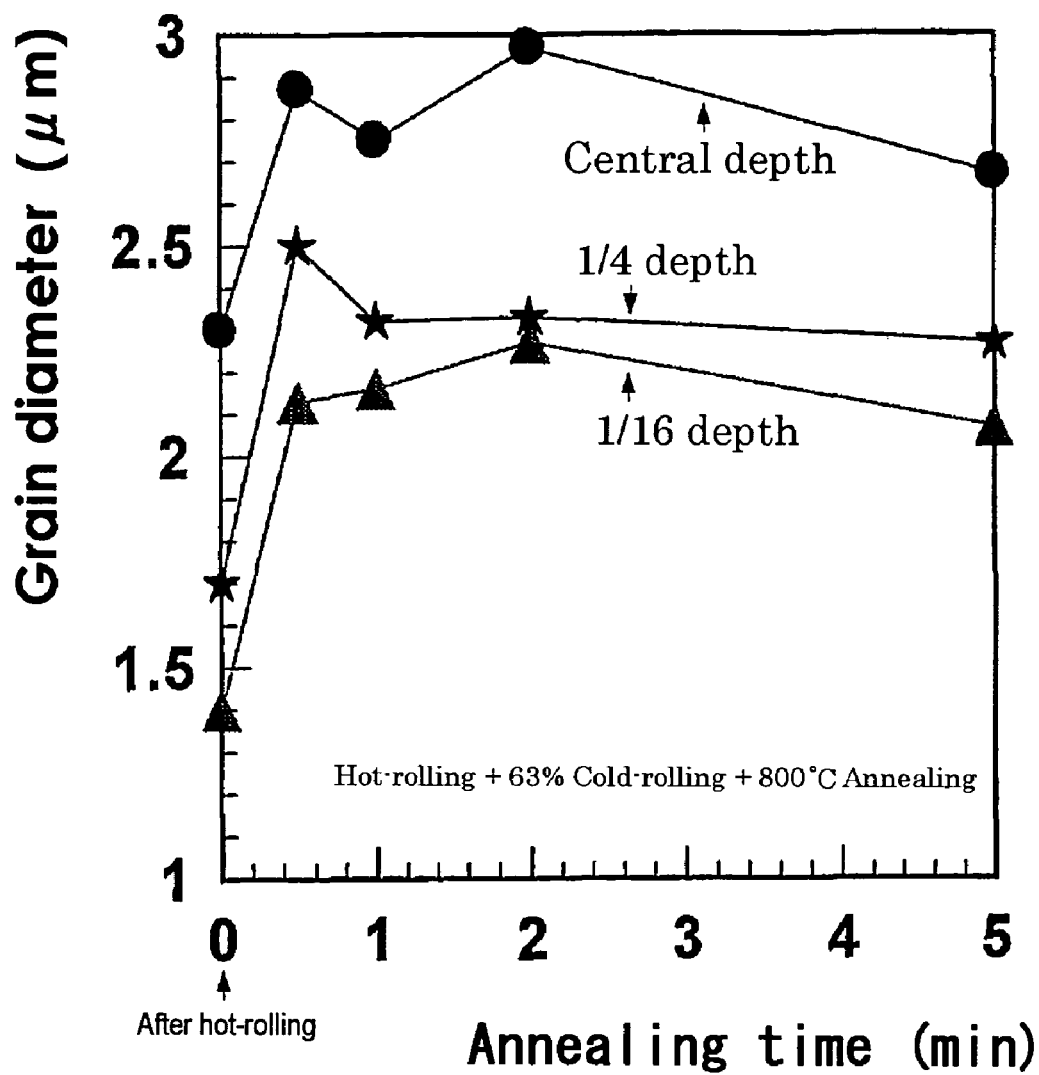
FIG. 3 This figure shows the changes, depending on the annealing time, of the ferrite grain diameter after cold rolling and annealing.
Figure 4:
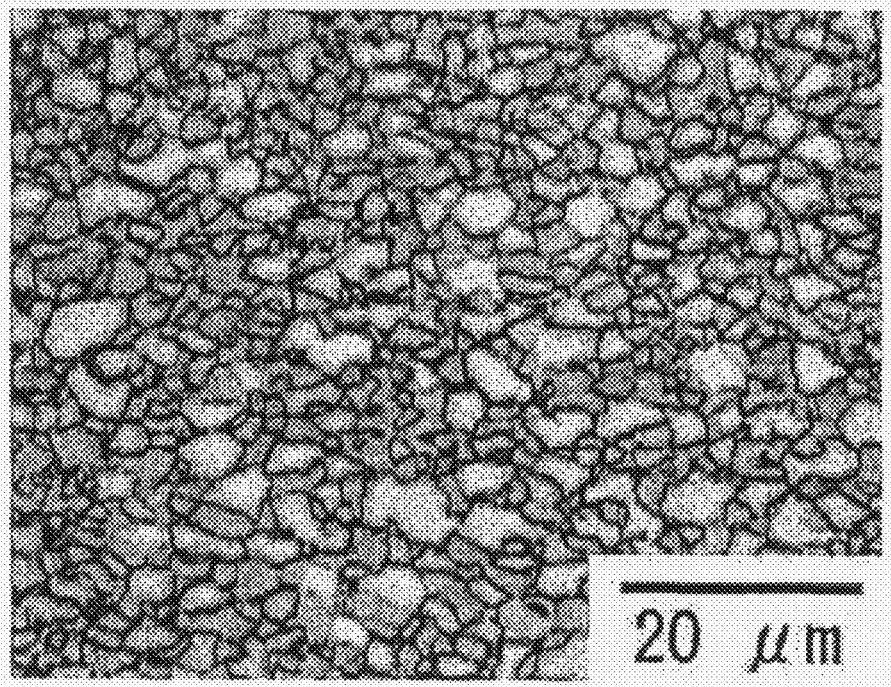
FIG. 4 This figure shows the microstructure after 5 minutes of annealing at 800° C. following cold rolling.
Figure 5:
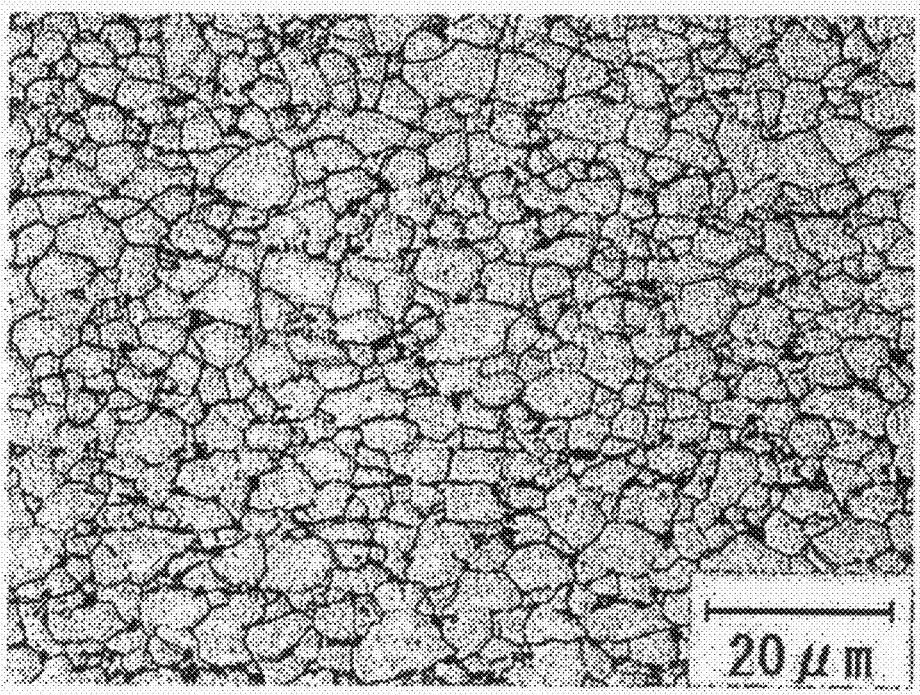
FIG. 5 This figure shows an example of the microstructure after annealing at 750° C. following cold rolling.

1—Ball head punch stretch forming test specimen
2—Weld line

The invention claimed is:

1. A hot-rolled steel sheet of carbon steel or low-alloy steel comprising C: 0.01 to 0.25% by mass, the main phase of which is ferrite, and is characterized in that the average ferrite crystal grain diameter D (μm) at the depth of ¼ of the sheet thickness from the steel sheet surface satisfies the relations respectively defined by the formulas (1) and (2) given below and the increase rate X (μm/min) in average ferrite crystal grain diameter at 700° C. at the depth of ¼ of the sheet thickness from the steel sheet surface and said average crystal grain diameter D (μm) satisfy the relation defined by the formula (3) given below:

$1.2 \leq D \leq 7$   formula (1)

$D \leq 2.7 + 5000/(5 + 350 \cdot C + 40 \cdot Mn)^2$   formula (2)

$D \cdot X \leq 0.1$   formula (3)

wherein C and Mn represent the contents (in % by mass) of the respective elements in the steel.

2. A hot-rolled steel sheet according to claim 1, characterized in that, at the depth of ¼ of the sheet thickness from the steel sheet surface, the area percentage of ferrite crystal grains the crystal grain diameter (μm) of which satisfies the relation defined by the formula (4) given below is at least 80%:

$D/3 \leq d \leq 3D$   formula (4)

wherein D represents the average ferrite crystal grain diameter (μm) at the depth of ¼ of the sheet thickness from the steel sheet surface.

3. A hot-rolled steel sheet according to claim 1, characterized in that it contains, as a second phase other than ferrite, a total of less than 50% of one or more species selected from the group consisting of less than 50% of bainite, less than 30% of pearlite, less than 50% of granular cementite, less than 5% of martensite and less than 3% of retained austenite and has a yield ratio lower than 0.75, % in each occurrence being % by volume.

4. A hot-rolled steel sheet according to claim 1, characterized in that it contains, as a second phase other than ferrite, 5 to 40% by volume of martensite and has a yield ratio lower than 0.75.

5. A hot-rolled steel sheet according to claim 1, characterized in that it contains, as a second phase other than ferrite, 3 to 30% by volume of retained austenite and has a product, TS×El of tensile strength TS (MPa) and total elongation El (%) of not less than 18000 (MPa·%).

6. A hot-rolled steel sheet according to claim 1, characterized in that the average crystal grain diameter Ds (μm) at the depth of 1/16 of the sheet thickness from the steel sheet surface, the average crystal grain diameter D (μm) at the depth of ¼ of the sheet thickness from the steel sheet surface and the average crystal grain diameter Dc (μm) at the center of the sheet thickness satisfy the relations Ds≦0.75D and D≦0.9Dc.

7. A hot-rolled steel sheet according to claim 1, characterized in that the carbon equivalent Ceq(I) defined by the formula (7) given below is 0.06 to 0.60%:

$Ceq(I) = C + Mn/6 + Si/24 + Cr/5 + Mo/4 + Ni/40 + V/14$   formula (7)

wherein the symbols of elements in the above formula represent the contents (in % by mass) of the respective elements in the steel.

8. A hot-rolled steel sheet according to claim 1, characterized in that the C content is not higher than 0.17% by mass, the carbon equivalent Ceq(II) defined by the formula (8) given below is 0.03 to 0.20% and the base metal resistance indicator Rsp defined by the formula (9) given below is not higher than 45:

$Ceq(II) = C + Mn/100 + Si/90 + Cr/100$   formula (8)

$Rsp = 13.5 \times (Si + Al + 0.4Mn + 0.4Cr) + 12.2$   formula (9)

wherein the symbols of elements in the above formulas represent the contents (in % by mass) of the respective elements in the steel.

9. A hot-dip plated hot-rolled steel sheet characterized in that it comprises a Zn, Al, Zn—Al alloy, or Fe—Zn alloy coat layer formed on the surface of a hot-rolled steel sheet according to claim 1.

* * * * *